(12) United States Patent
Kawatoko et al.

(10) Patent No.: US 7,548,347 B2
(45) Date of Patent: Jun. 16, 2009

(54) IMAGE PRINTING APPARATUS AND IMAGE PRINTING METHOD

(75) Inventors: Norihiro Kawatoko, Kanagawa (JP); Hidehiko Kanda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 830 days.

(21) Appl. No.: 10/647,271

(22) Filed: Aug. 26, 2003

(65) Prior Publication Data

US 2004/0042047 A1 Mar. 4, 2004

(30) Foreign Application Priority Data

Aug. 28, 2002 (JP) ............... 2002-249481

(51) Int. Cl.
*G06K 15/00* (2006.01)
*H04N 1/405* (2006.01)

(52) U.S. Cl. ............ 358/3.06; 358/3.02; 358/3.09; 358/3.1; 347/12; 347/15; 347/40

(58) Field of Classification Search ............ 347/15, 347/19, 9, 41, 37, 10, 12, 40; 358/1.9, 1.8, 358/3.06, 3.13, 1.3, 1.15, 1.12, 3.02, 3.1, 358/3.09; 235/454
See application file for complete search history.

(56) References Cited

U.S. PATENT DOCUMENTS

| | | | | |
|---|---|---|---|---|
| 5,831,642 | A * | 11/1998 | Matsubara et al. ........... 347/9 |
| 6,053,596 | A * | 4/2000 | Nakano et al. ............. 347/15 |
| 6,142,604 | A | 11/2000 | Kanda et al. .............. 347/41 |
| 6,164,745 | A | 12/2000 | Nagoshi et al. ............ 347/15 |
| 6,302,505 | B1 * | 10/2001 | Askeland et al. ............ 347/9 |
| 6,302,508 | B1 | 10/2001 | Asauchi et al. ............ 347/15 |
| 6,378,982 | B2 | 4/2002 | Ono et al. ................ 347/41 |
| 6,412,902 | B2 * | 7/2002 | Matsumoto et al. ......... 347/19 |
| 6,412,909 | B1 * | 7/2002 | Tayuki et al. ............. 347/41 |
| 6,457,806 | B2 * | 10/2002 | Hickman .................. 347/37 |
| 6,540,327 | B1 | 4/2003 | Akiyama et al. ........... 347/43 |
| 6,557,964 | B2 | 5/2003 | Kawatoko et al. .......... 347/15 |
| 6,561,423 | B2 * | 5/2003 | Yoshioka ................ 235/454 |
| 6,601,939 | B2 | 8/2003 | Fujita et al. ............. 347/15 |
| 6,690,485 | B1 * | 2/2004 | Borrell et al. ............ 358/1.9 |

(Continued)

FOREIGN PATENT DOCUMENTS

JP 7-81190 3/1995

(Continued)

*Primary Examiner*—Edward L Coles
*Assistant Examiner*—Satwant K Singh
(74) *Attorney, Agent, or Firm*—Fitzpatrick, Cella, Harper & Scinto

(57) ABSTRACT

This invention has as its object to realize multi-pass print control which requires a short processing time by a simple arrangement. To this end, a printer according to this invention attains multi-grayscale print control by changing the number of dots to be printed on each pixel to overlap each other in multi-pass print control that prints the pixel in a plurality of scans. In this case, index patterns, each of which designates which of scans is to be used to print in accordance with the density level of a pixel, are prepared for respective pixel values. If a plurality of patterns are prepared for each pixel value, a pattern is randomly selected from them. An image is printed in accordance with a print pattern defined by the selected pattern.

14 Claims, 26 Drawing Sheets

U.S. PATENT DOCUMENTS

| | | | |
|---|---|---|---|
| 6,707,572 B1 * | 3/2004 | Walker et al. | 358/1.9 |
| 6,712,441 B2 * | 3/2004 | Sato et al. | 347/15 |
| 6,731,398 B1 * | 5/2004 | Yoshizawa | 358/1.2 |
| 6,783,203 B2 * | 8/2004 | Fujimori | 347/15 |
| 6,932,452 B2 * | 8/2005 | Nou | 347/10 |
| 6,999,202 B2 * | 2/2006 | Bybell et al. | 358/3.06 |
| 7,009,729 B2 * | 3/2006 | Fujita | 358/1.3 |
| 2003/0007024 A1 * | 1/2003 | Fujimori | 347/15 |

FOREIGN PATENT DOCUMENTS

JP    2000-225718    8/2000

* cited by examiner

FIG. 9A

| | SELECTION RANGE |
|---|---|
| Level 0 | 1 |
| Level 1 | 1~6 |
| Level 2 | 1~3 |
| Level 3 | 1~2 |
| Level 4 | 1~3 |

FIG. 9B

| Level 4 | Level 4 | Level 4 | Level 4 | Level 2 | Level 2 | Level 1 | Level 1 | Level 1 | Level 2 | ... |

FIG. 9C

| Level 4 | Level 4 | Level 4 | Level 4 | Level 2 | Level 2 | Level 1 | Level 1 | Level 1 | Level 2 | ... |
| --- | --- | --- | --- | --- | --- | --- | --- | --- | --- | --- |
| RANDOM NUMBER GENERATION 1~3 | RANDOM NUMBER GENERATION 1~3 | RANDOM NUMBER GENERATION 1~3 | RANDOM NUMBER GENERATION 1~3 | RANDOM NUMBER GENERATION 1~3 | RANDOM NUMBER GENERATION 1~3 | RANDOM NUMBER GENERATION 1~6 | RANDOM NUMBER GENERATION 1~6 | RANDOM NUMBER GENERATION 1~6 | RANDOM NUMBER GENERATION 1~3 | ... |

FIG. 9D

| Level 4 | Level 4 | Level 4 | Level 4 | Level 2 | Level 2 | Level 1 | Level 1 | Level 1 | Level 2 | ... |
| --- | --- | --- | --- | --- | --- | --- | --- | --- | --- | --- |
| INDEX No.1 | INDEX No.2 | INDEX No.1 | INDEX No.3 | INDEX No.1 | INDEX No.3 | INDEX No.1 | INDEX No.2 | INDEX No.6 | INDEX No.1 | ... |

| 0 | 1 | 2 | 2 | 2 | 3 |
|---|---|---|---|---|---|
| 0 | 2 | 2 | 3 | 3 | 2 |
| 4 | 4 | 2 | 2 | 1 | 2 |
| 4 | 4 | 1 | 3 | 2 | 1 |

10B1  10B2  10B3

| 0 | 1-3 | 2-1 | 2-1 | 2-3 | 3-2 |
|---|---|---|---|---|---|
| 0 | 2-2 | 2-3 | 3-2 | 3-1 | 2-2 |
| 4-1 | 4-2 | 2-2 | 2-1 | 1-5 | 2-1 |
| 4-3 | 4-1 | 1-4 | 3-1 | 2-2 | 1-6 |

Level 1

Level 2

Level 3

Level 4

Level 1

Level 2

Level 3

Level 4

Level 1

- 1 DOT
- 2 DOTS
- 3 DOTS
- 4 DOTS
- 6 DOTS

Level 2

- 1 DOT
- 2 DOTS
- 3 DOTS
- 4 DOTS
- 6 DOTS

Level 3

- 1 DOT
- 2 DOTS
- 3 DOTS
- 4 DOTS
- 6 DOTS

Level 4

- 1 DOT
- 2 DOTS
- 3 DOTS
- 4 DOTS
- 6 DOTS

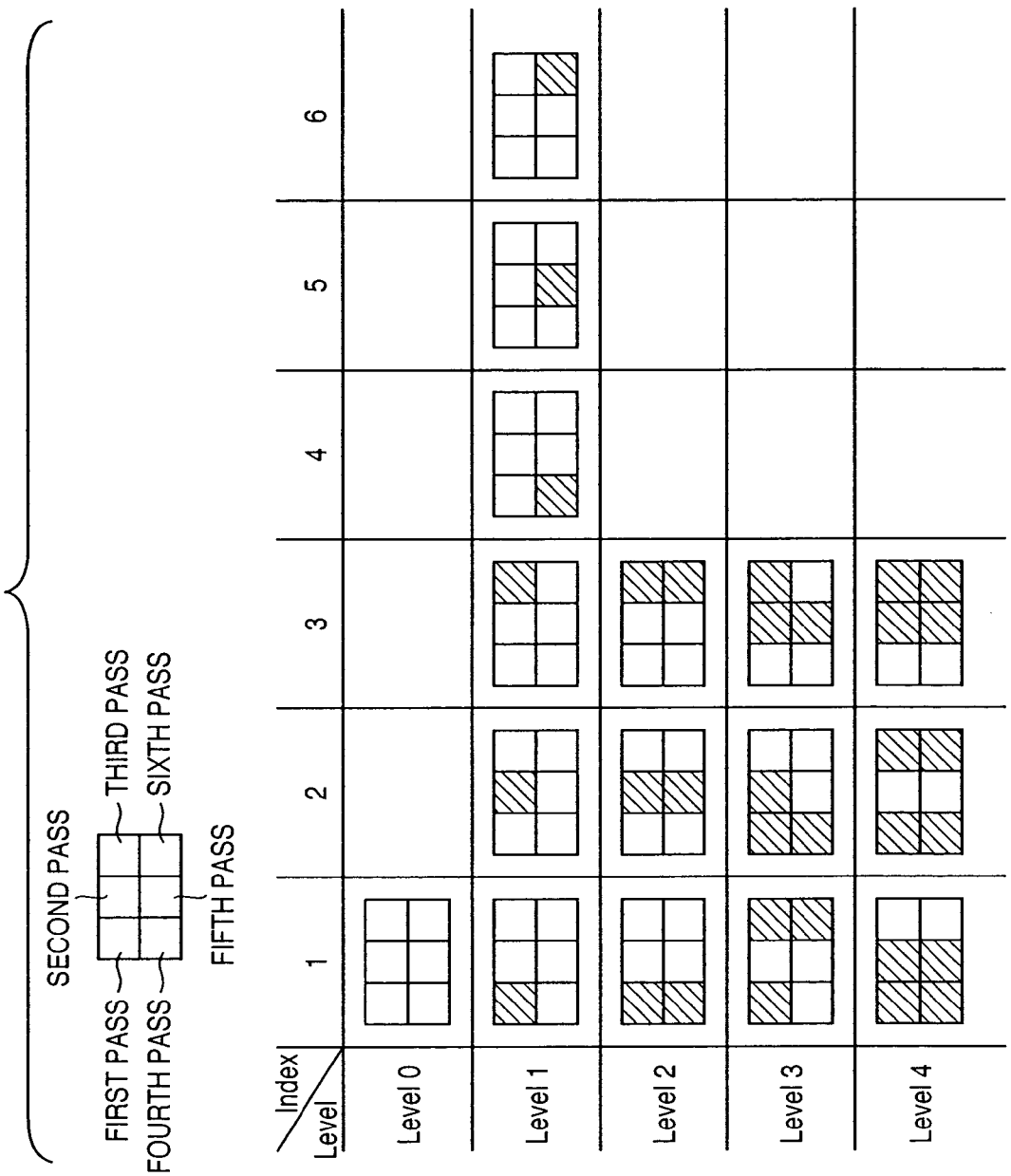

Level 1

Level 2

Level 3

Level 4

Level 1

○ 1 DOT
◐ 2 DOTS
● 3 DOTS
⊗ 4 DOTS

Level 2

○ 1 DOT
◐ 2 DOTS
● 3 DOTS
⊗ 4 DOTS

Level 3

○ 1 DOT
◐ 2 DOTS
● 3 DOTS
⊗ 4 DOTS

Level 4

○ 1 DOT
◐ 2 DOTS
● 3 DOTS
⊗ 4 DOTS

Level 1

Level 2

Level 3

Level 4

Level 1

- ◯ 1 DOT
- ◯ 2 DOTS
- ◯ 3 DOTS
- ◯ 4 DOTS

Level 2

- ◯ 1 DOT
- ◯ 2 DOTS
- ◯ 3 DOTS
- ◯ 4 DOTS

Level 3

- ◯ 1 DOT
- ◯ 2 DOTS
- ◯ 3 DOTS
- ◯ 4 DOTS

Level 4

- ◯ 1 DOT
- ◯ 2 DOTS
- ◯ 3 DOTS
- ◯ 4 DOTS

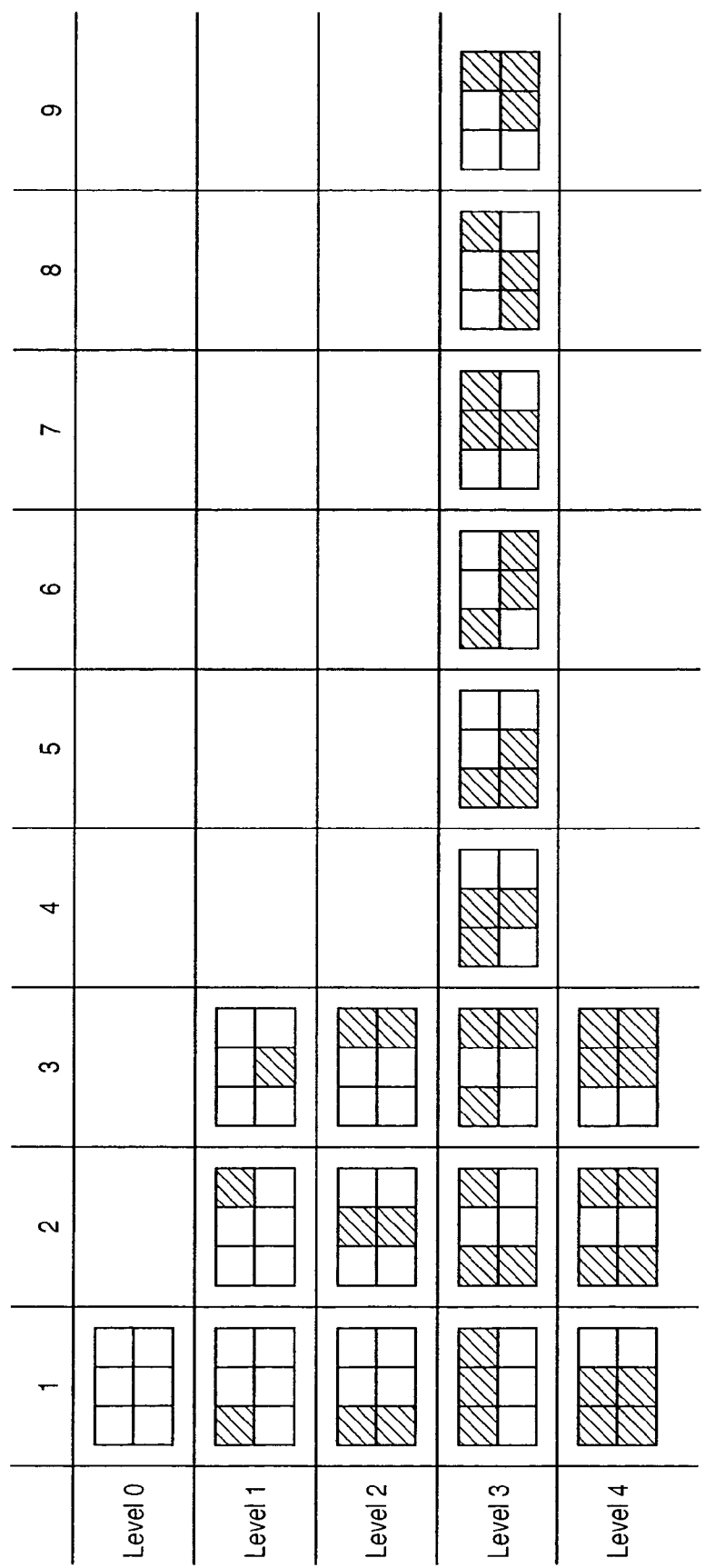

Level 1

Level 2

Level 3

Level 4

Level 1

- ⊘ 1 DOT
- ⊘ 2 DOTS
- ⊘ 3 DOTS
- ⊗ 4 DOTS

Level 2

- ⊘ 1 DOT
- ⊘ 2 DOTS
- ⊘ 3 DOTS
- ⊗ 4 DOTS

Level 3

- ⊘ 1 DOT
- ⊘ 2 DOTS
- ⊘ 3 DOTS
- ⊗ 4 DOTS

Level 4

- ⊘ 1 DOT
- ⊘ 2 DOTS
- ⊘ 3 DOTS
- ⊗ 4 DOTS

IMAGE PRINTING APPARATUS AND IMAGE PRINTING METHOD

FIELD OF THE INVENTION

The present invention relates to a printing apparatus and printing method and, more particularly, to an image printing method, image processing method, program, storage medium, and image printing system, which print an image using multi-pass print control that suppresses the influences of performance variations of respective print elements in a print head, and obscures the boundaries of print bands formed every time the print head scans, by printing a single raster in a plurality of scans.

BACKGROUND OF THE INVENTION

A printing apparatus such as a printer, copying machine, facsimile, or the like print an image defined by dot patterns on a print medium such as a paper sheet, plastic thin plate, or the like on the basis of image information. Such printing apparatus can be categorized into an ink-jet system, wire-dot system, thermal system, laser beam system, and the like in accordance with the printing systems. Of these systems, the ink-jet system (ink-jet printing apparatus) prints an image by ejecting ink (print liquid) droplets from ejection ports of a print head and attaching them on a print medium. In recent years, a large number of printing apparatuses are used, and are required to meet high-speed printing, high resolution, high image quality, low noise, and the like. The ink-jet printing apparatus can meet such requirements. The ink-jet printing apparatus can stably print images on various print media since it can achieve a non-contact print process by ejecting ink from a print head.

As the ink-jet printing apparatus, a serial printing apparatus which prints an image by serially scanning a print head with respect to a print medium is prevalent, since it is difficult to increase the size of the print head. In such serial printing apparatus, various proposals have been conventionally made to improve the image quality of a print image.

For example, control that suppresses the influences of performance variations of respective print elements in a print head, and obscures the boundaries of print bands formed every time the print head scans, by printing a single raster in a plurality of scans is executed (to be referred to as "multi-pass print" hereinafter). In the multi-pass print process, it is a common practice to feed a paper sheet by a predetermined amount every time the print head is scanned once, in place of repeating head scans without feeding a paper sheet at all. For example, in case of a multi-pass print process using six passes, a nozzle array arranged in the head is divided into six in the paper feed direction, and a paper sheet is fed for each scan by a distance $\frac{1}{6}$ the nozzle array length.

As a method for obtaining grayscale by two values "print/not print", a method of defining grayscale by printing ink droplets corresponding in number to a required density to overlap each other within a grid (so-called "pixel") of a given resolution (to be referred to as a dot overlap method hereinafter), a method of obtaining grayscale by setting an output resolution to be higher than an input resolution, and using a dot layout pattern corresponding to an input signal level (to be referred to as an index layout print method hereinafter), and the like are available.

Furthermore, the serial printing apparatus executes two-way print processes that print an image in reciprocal scans. Note that one of reciprocal directions is called a "forward" direction, and the other direction is called a "backward" direction in this specification.

However, in case of the two-way print processes, dot landing positions readily deviate in the forward and backward print processes, and such deviation of ink landing positions results in adverse effects such as granularity, color nonuniformity, and the like on a print image. In order to prevent such adverse effects, various proposals have been made.

For example, Japanese Patent Laid-Open No. 07-081190 has proposed a test print method, which can attain accurate register adjustment in the forward and backward directions by checking the uniformity of a pattern printed in the forward and backward print processes, on the basis of a method which is conventionally used as a register adjustment method and corrects dot landing positions based on vertical ruled lines printed in the forward and backward directions. Note that register adjustment means adjustment of the print position.

Moreover, Japanese Patent Laid-Open No. 2000-225718 has proposed a printing apparatus which prevents deterioration of image quality due to two-way deviations by nearly matching the barycentric position of a pixel with those of successive dots printed for that pixel upon forming one pixel by successively recording a plurality of dots.

However, such conventional multi-pass printing methods require complicated arrangements, since a process for selecting a dot layout pattern to be printed for each pixel and assigning dots of the selected pattern to a plurality of scans using a decimation mask is executed.

When the multi-pass print process is combined with the two-way print process, very precise positional deviation adjustment means between the forward and backward print processes is required. Furthermore, when the user starts a print process without adjusting any positional deviations, or when positional deviations recur due to aging even after they are adjusted, the adverse influences on an image are enhanced.

SUMMARY OF THE INVENTION

The present invention has been made in consideration of the above prior arts, and has as its object to provide an image printing method, image processing method, program, storage medium, and image printing system and method, which can implement multi-pass print control by a simple arrangement.

It is another object of the present invention to provide an image printing method, image processing method, program, storage medium, and image printing system and method, which can print a high-quality image by minimizing the influences of positional deviations between the forward and backward directions.

In order to achieve the above objects, the present invention has the following arrangement.

An image printing method for completing a print process of each pixel by making a plurality of main scans of a print head, which prints dots on a print medium, with respect to the print medium, comprises a step of assigning, to a pixel of interest, a pattern used to determine which of the plurality of main scans is used to print a dot to be printed for the pixel of interest; and a printing step of printing a dot on the pixel of interest in the main scan determined by the assigned pattern, wherein the assignment step includes a step of selecting one pattern from a plurality of patterns corresponding to each of density levels on the basis of a density level of the pixel of interest, and assigning the selected pattern to the pixel of interest.

Alternatively, the present invention has the following arrangement.

An image printing method for completing a print process of each pixel by making a plurality of scans of a print head, which prints dots on a print medium, with respect to the print medium, comprises a step of assigning, to each pixel, a pattern which specifies the number of dots corresponding to a density level of the pixel and scans used to print the dots.

Alternatively, the present invention has the following arrangement.

An image printing method for completing a print process of each pixel by making a plurality of scans of a print head, which prints dots on a print medium, with respect to the print medium, comprises an assignment step of assigning a pattern, used to determine which of the plurality of scans is used to print a dot to be printed for each pixel, to that pixel;

a generation step of generating a pattern of dots to be printed in each scan of the print head on the basis of the pattern assigned to the pixel; and a step of printing dots on each pixel on the basis of the generated pattern.

Preferably, a plurality of patterns are prepared in correspondence with each of the density levels of the pixel, and the assignment step includes a step of selecting one of the plurality of patterns corresponding to a density level of a pixel of interest randomly or in a predetermined order in accordance with the density level of the pixel of interest, and assigning the selected pattern to the pixel of interest.

The plurality of main scans preferably include both forward and backward scans of the print head, and a pattern corresponding to a density level of a pixel which requires to print two or more dots is defined so that dots to be printed are distributed to both the forward and backward scans.

The plurality of scans preferably include both forward and backward scans of the print head, and the pattern is defined so that dots to be printed are distributed to one of the forward and backward scans.

Preferably, the plurality of patterns corresponding to each of density levels that the pixel can assume are assigned so that densities printed in forward scans become equal to densities printed in backward scans.

Alternatively, the present invention has the following arrangement.

An image printing method for completing a print process of each pixel by making a plurality of scans of a print head, which prints dots on a print medium, with respect to the print medium, comprises a step of assigning a pattern, used to determine which of the plurality of main scans is used to print a dot to be printed for each pixel, to that pixel.

Alternatively, the present invention has the following arrangement.

An image processing method for completing a print process of each pixel by making a plurality of main scans of a print head, which prints dots on a print medium, with respect to the print medium, comprises a step of assigning, to a pixel of interest, a pattern used to determine which of the plurality of main scans is used to print a dot to be printed for the pixel of interest, wherein the assignment step includes a step of selecting one pattern from a plurality of patterns corresponding to each of density levels that the pixel can assume in correspondence with a density level of the pixel of interest, and assigning the selected pattern to the pixel of interest.

Alternatively, the present invention has the following arrangement.

An image processing method for completing a print process of each pixel by making a plurality of scans of a print head, which prints dots on a print medium, with respect to the print medium, comprises a step of assigning, to each pixel, a pattern which specifies the number of dots corresponding to a density level of the pixel and scans used to print the dots.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 9A to 9D are views for explaining a method of determining pass allocation patterns;

FIG. 18 shows pass allocation index patterns of the third embodiment;

FIG. 24 shows pass allocation patterns of the fourth embodiment;

DETAILED DESCRIPTION OF THE PREFERRED EMBODIMENTS

First Embodiment

Preferred embodiments of the present invention will now be described with reference to the accompanying drawings. In embodiments to be described hereinafter, the present invention is applied to an ink-jet printing apparatus.

Prior to the description of the embodiments of the present invention, an example of the basic arrangement of an ink-jet printing apparatus to which the present invention can be applied will be described with reference to FIGS. 1 and 2. In the following embodiments, the ink-jet printing apparatus will be simply referred to as a printing apparatus or printer.

<Basic Arrangement Example of Ink-Jet Printing Apparatus>

Figure 1:
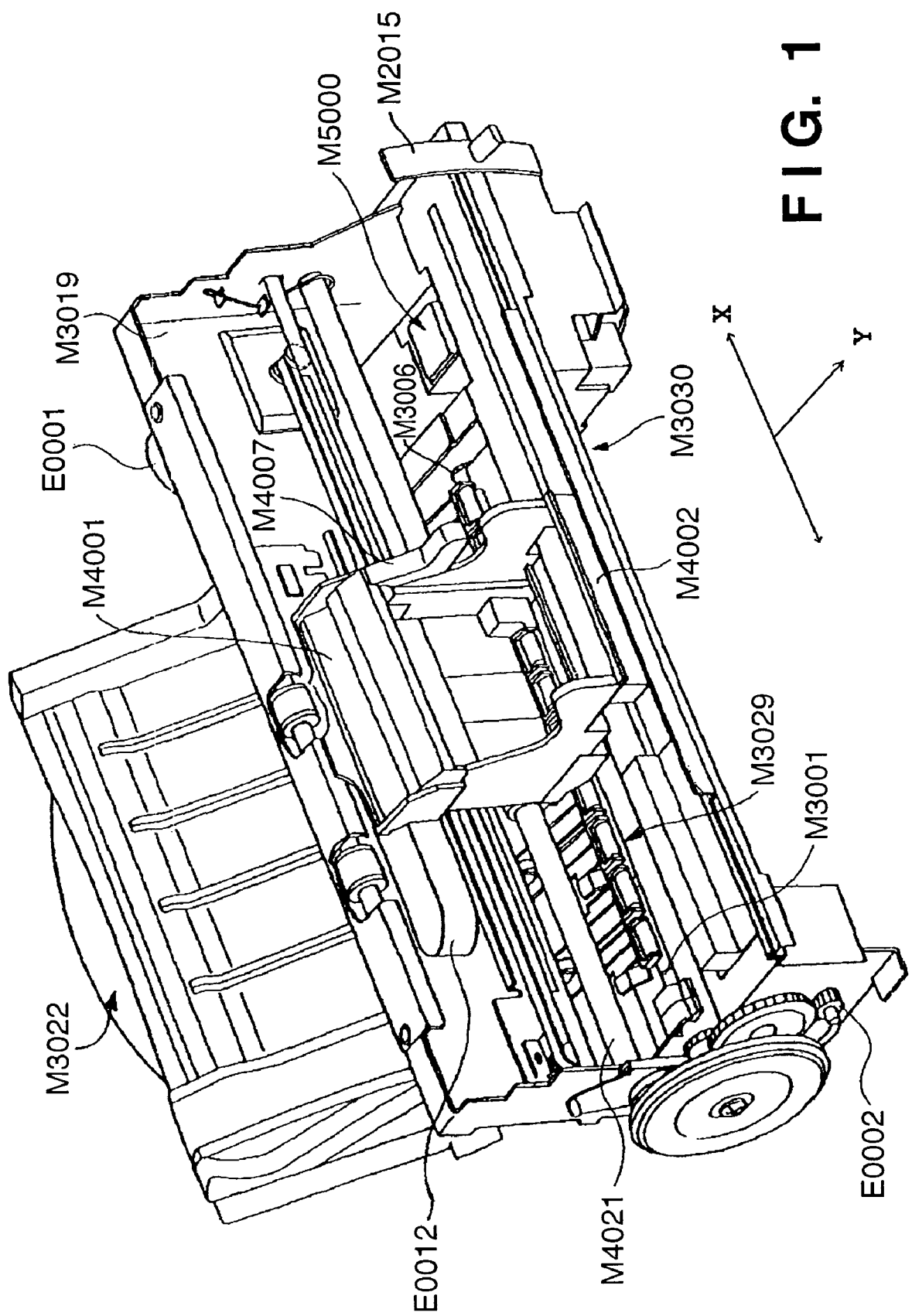
FIG. 1 is a perspective view showing principal part of an ink-jet printing apparatus.
Figure 2:
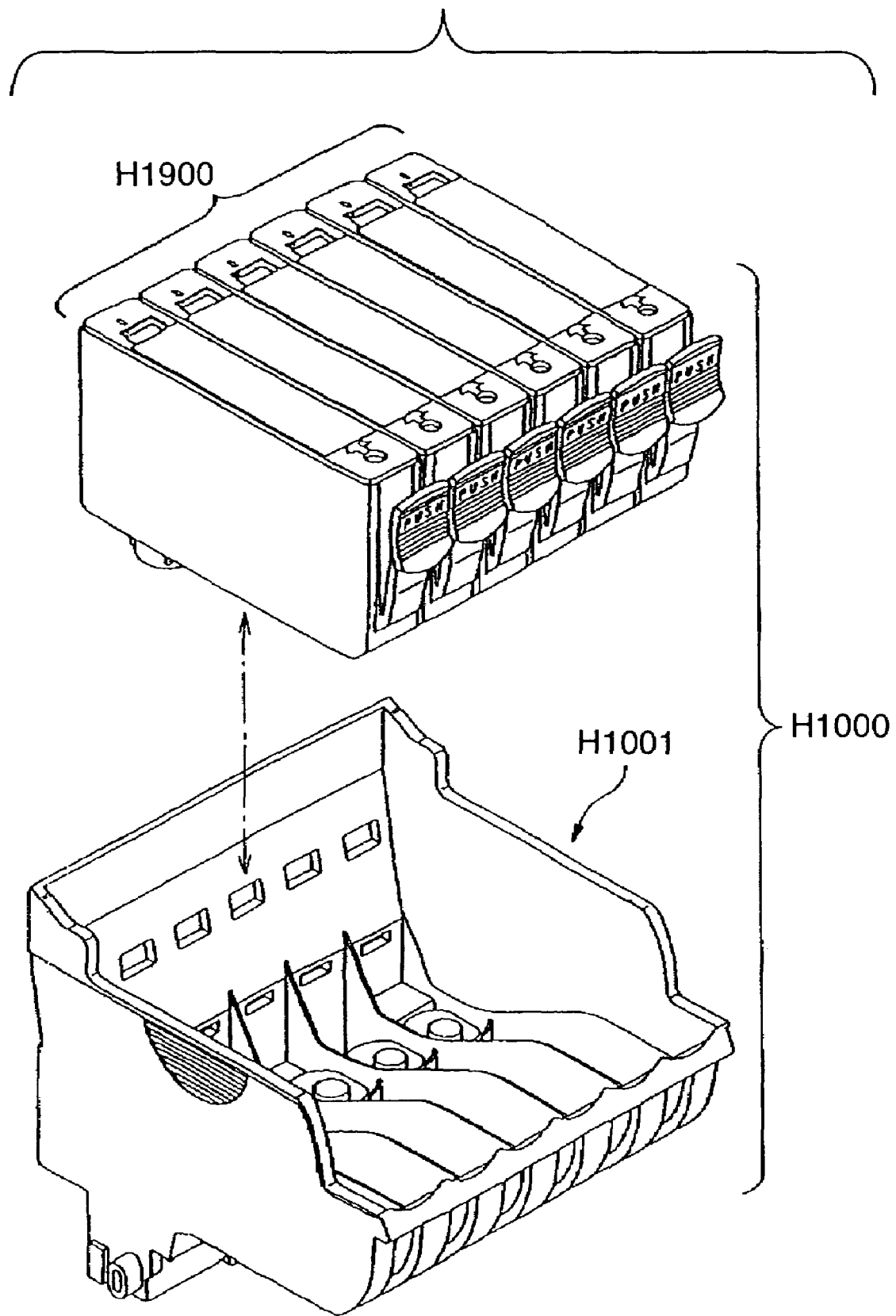
FIG. 2 is a perspective view of a print head used in the ink-jet printing apparatus.

FIGS. 1 and 2 are schematic perspective views of principal part of an ink-jet printing apparatus to which the present invention can be applied.

Referring to FIG. 1, a chassis M3019 housed in an exterior member of the printing apparatus is formed of a plurality of metal plate members to form the framework of the printing apparatus, and holds the following printing operation mechanisms. An automatic feeder M3022 automatically feeds paper sheets (print media) into the apparatus main body. A convey unit M3029 guides a paper sheet fed one by one from the automatic feeder M3022 to a predetermined print position, and also guides the paper sheet from that print position to an exhaust unit M3030. An arrow Y indicates the convey direction (sub-scan direction) of a paper sheet. The paper sheet conveyed to the print position undergoes a predetermined print process by a printing unit. This printing unit undergoes a recovery process by a recovery unit M5000. Reference numeral M2015 denotes a paper gap adjust lever; and M3006, a bearing of an LF roller M3001.

In the printing unit, a carriage M4001 is supported by a carriage shaft M4021 to be movable in the main scan direction indicated by an arrow X. An ink-jet print head H1001 (see FIG. 2) that can eject ink is detachably mounted on this carriage M4001. The print head H1001 of this embodiment forms a print head cartridge H1000 together with ink tanks H1900 that store inks, as shown in FIG. 2. As the ink tanks H1900, for example, black, light cyan, light magenta, cyan, magenta, and yellow, independent color ink tanks are prepared to attain a photorealistic, high-quality color print process. Each of these ink tanks H1900 is detachable from the print head H1001.

The print head H1001 may use heat energy generated by an electrothermal transducer as energy used to eject ink. In this case, heat generated by the electrothermal transducer causes film boiling in ink, and ink is ejected from an ink ejection port by foaming energy at that time.

The recovery unit M5000 comprises a cap (not shown) that caps the ink ejection port forming surface of the print head H1001. A suction pump that can introduce a negative pressure inside the cap may be connected to the cap. In this case, a negative pressure is introduced into the cap that covers the ink ejection ports of the print head H1001 to make the ink ejection ports deliver ink by suction, thus attaining a recovery process (to be also referred to as a "suction recovery process") to maintain a good ink ejection state of the print head H1001. Alternatively, by ejecting inks which do not contribute to an image print process from the ink ejection ports into the cap, a recovery process (to be also referred to as an "ejection recovery process") can be made to maintain a good ink ejection state of the print head H1001.

The carriage M4001 has a carriage cover M4002 used to guide the print head H1001 to a predetermined mount position on the carriage M4001, as shown in FIG. 1. Furthermore, the carriage M4001 has a head set lever M4007 which engages with a tank holder of the print head H1001 and sets the print head H1001 at the predetermined mount position. The head set lever M4007 is provided to be pivotal about a head set lever shaft located above the carriage M4001, and its engaging portion that engages with the print head H1001 is equipped with a spring-biased head set plate (not shown). The head set lever M4007 mounts the print head H1001 on the carriage M4001 while pressing it by that resilience.

Upon executing a print process by the ink-jet printing apparatus with the above structure, print data sent from an external I/F is temporarily stored in a print buffer. Then, an image is sequentially printed on a paper sheet by repeating a print operation for controlling the print head H1001 to eject ink based on the print data and a feed operation for controlling a line feed (LF) motor to feed a paper sheet by a predetermined amount in the sub-scan direction, while controlling a carriage (CR) motor to move the print head H1001 in the main-scan direction together with the carriage M4001.

<Description of Pass Allocation>

Figure 3:
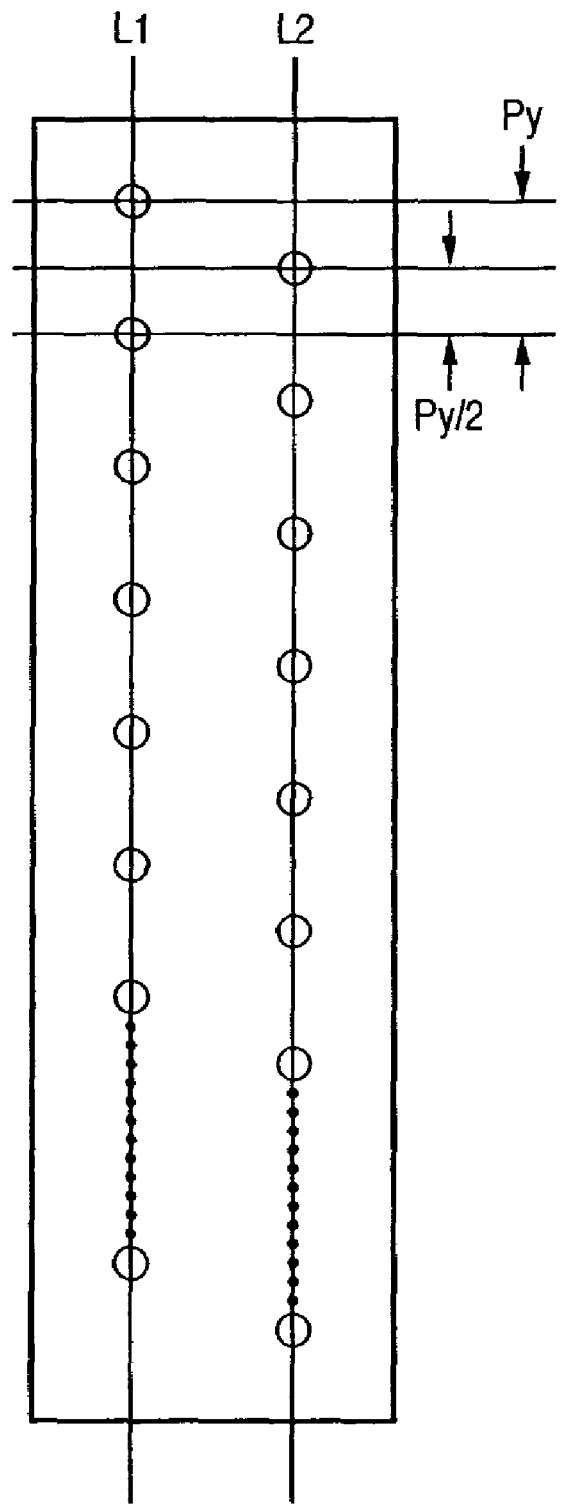
FIG. 3 shows a head example.
Figure 4:
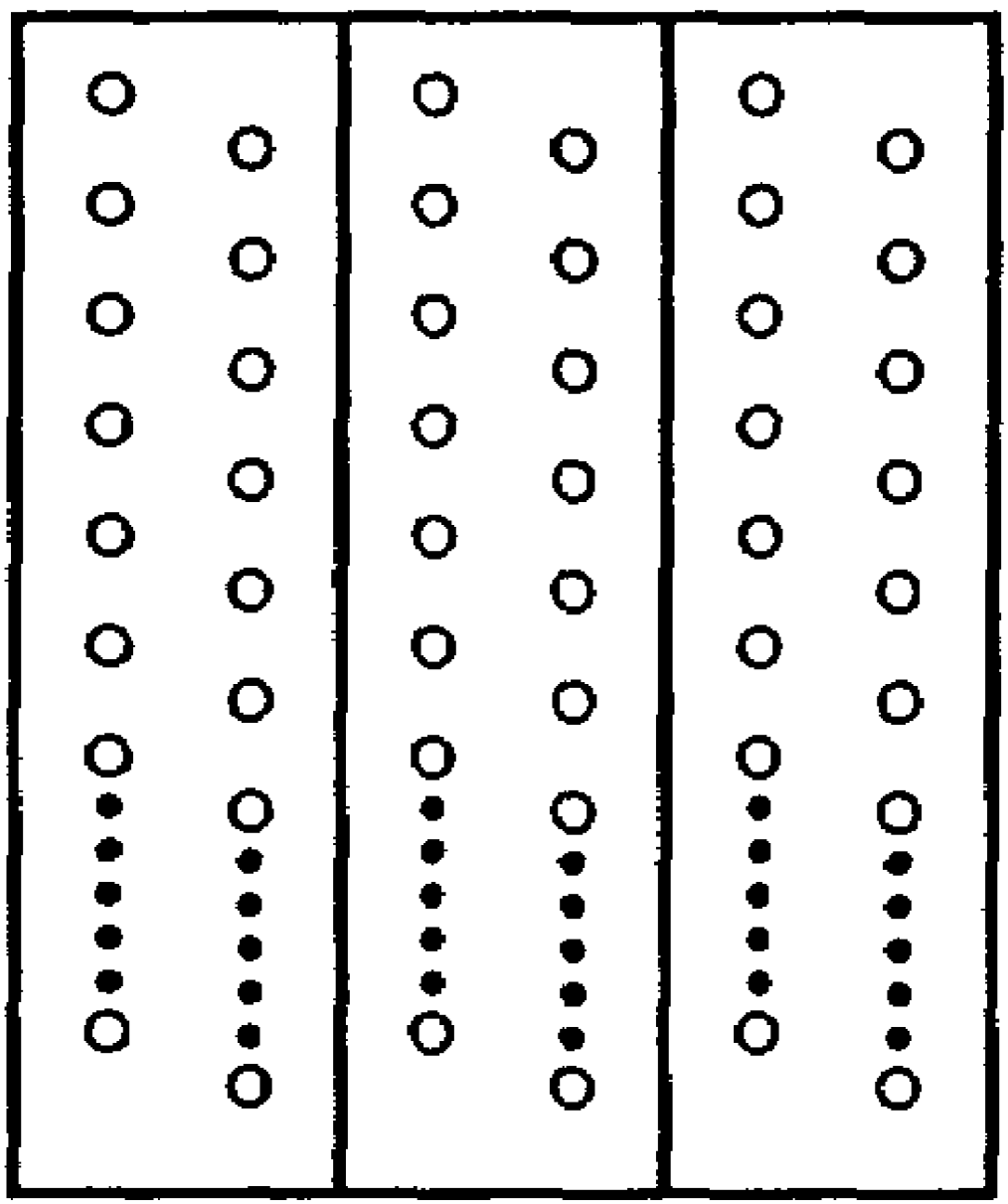
FIG. 4 shows a combined head example.
Figure 5:
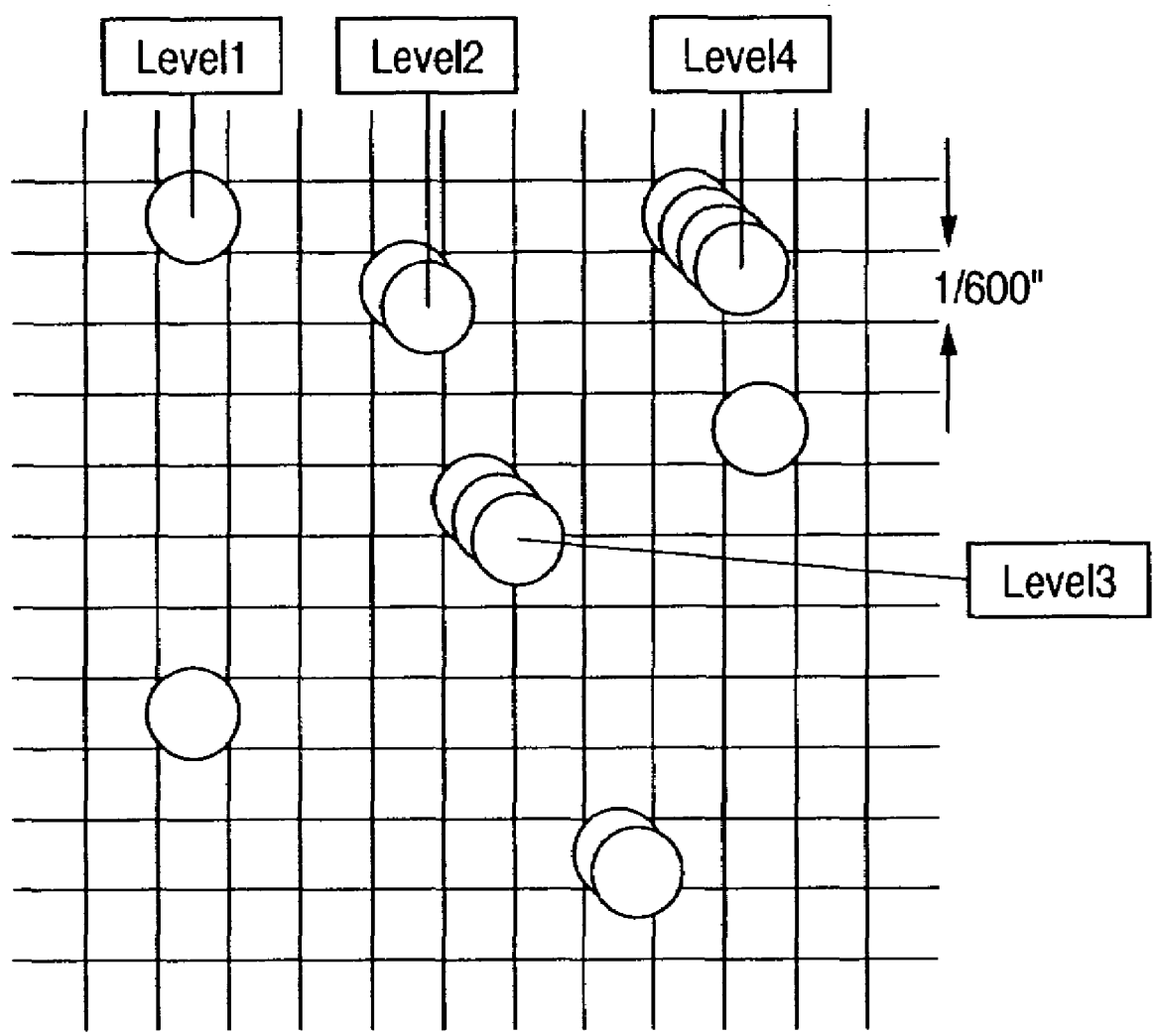
FIG. 5 illustrates dots which are printed on a print medium to overlap each other.

FIGS. 3 to 5 are views for explaining the first embodiment of the present invention, which can be applied to the aforementioned ink-jet printing apparatus.

FIG. 3 is an explanatory view of an example of an ink-jet print head that can be adopted in this embodiment. A print head of this embodiment is formed with two ejection port arrays L1 and L2, each of which has a plurality of ejection ports that line up in a predetermined direction. On each of the ejection port arrays L1 and L2, the ejection ports line up at spacing Py corresponding to the print density of 300 dpi. Each of the ejection port arrays 32 L1 and L2 ejection ports. The ejection ports on the ejection port arrays L1 and L2 line up to shift from each other by a spacing (Py/2) corresponding to the print density of 600 dpi in their lineup direction. Using such print head, an image can be printed at a dot density of 600 dpi in the sub-scan direction (ejection port lineup direction) Y in FIG. 1. A plurality of such print heads may be combined, as shown in, e.g., FIG. 4, and may eject inks of different types. In such case, a color image can be printed by controlling respective print heads to eject cyan, magenta, and yellow inks.

FIG. 5 shows dots which are printed on a print medium to overlap each other. This embodiment will exemplify a printing apparatus which has a print density of 600 dpi, and prints a plurality of dots on a square grid corresponding to each pixel to overlap each other. The spacing between neighboring grid pints in FIG. 5 is 1/600", i.e., 42 µm. The print head (FIG. 3) used in this embodiment ejects ink droplets of about 5pl (picoliters). The diameter of an ink dot formed when the ejected ink lands on a print medium is about 40 µm. The input resolution is 600×600 dpi. Zero, one, two, three, or four ink dots are formed on grids of 600×600 dpi to overlap each other, thus achieving a grayscale print process. That is, in this embodiment, grayscale expression is made using five values of gray scale levels (to be also referred to as "density levels" hereinafter) 0 to 4. Also, this embodiment adopts multi-pass print control that controls the print head to make a plurality of main scans on an identical region (identical raster region or identical pixel region) of a print medium and completes a print process on that region in the plurality of main scans. More specifically, 6-pass print control that completes a print process in six scans is executed. Note that FIG. 5 illustrates dots which overlap one grid at different positions for the sake of illustrative convenience. However, in practice, a grayscale print process is done by forming a plurality of dots at an identical position in a grid to overlap each other. Upon focusing an attention on one pixel, several candidates are available as combinations of passes that print dots on that pixel of interest. For example, for a pixel of density level (to be simplify referred to as a level hereinafter) 1, one of six passes can print a dot. For a pixel of level 2, two arbitrary passes can print dots. In this way, assigning passes that print dots in correspondence with the level of a pixel to the first to sixth passes is called pass allocation, and a pattern that specifies a combination of passes that print dots is called a "pass allocation pattern".

In this connection, this embodiment is not limited to the arrangement that ejects ink dots at an identical position in each grid, but may adopt an arrangement that achieves grayscale print control by ejecting ink dots at different positions in each grid.

Figure 6:
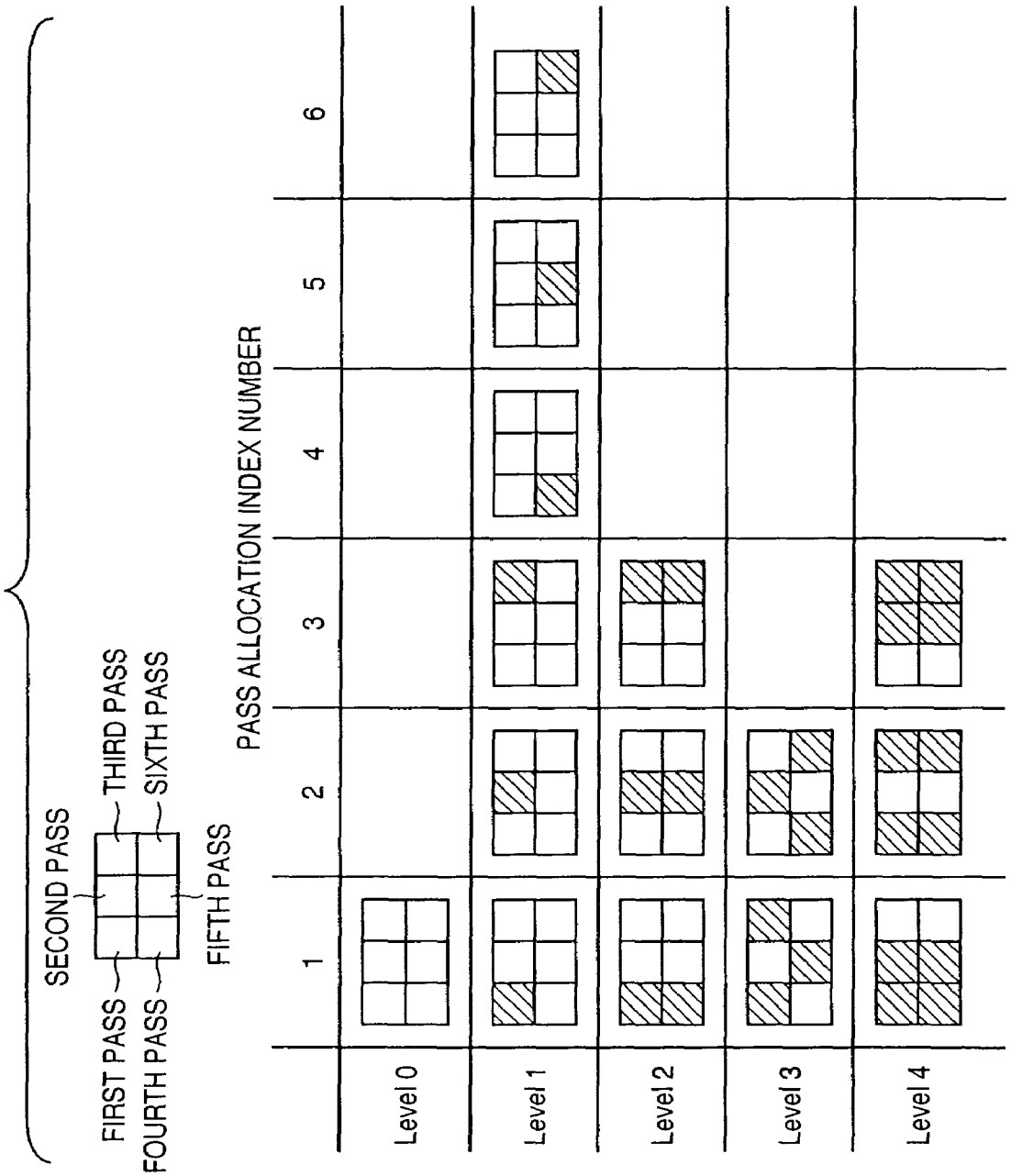
FIG. 6 shows pass allocation patterns according to the first embodiment of the present invention.

FIG. 6 shows an example of pass allocation patterns adopted in the first embodiment of the present invention. In this embodiment, zero to four dots are printed in a single grid (single pixel) within six scans. To realize such control, a plurality of patterns each having the same number of grids as the number of scans (patterns each of which is partitioned into grids equal to the number of scans) are prepared as the pass allocation patterns. Using one of these patterns, which of six passes is/are used to print dots to be printed on a grid of interest (pixel of interest) is designated (determined). FIG. 6 illustrates dots to be printed in the first, second, and third passes from the upper left grid to the right of six grids, and those to be printed in the fourth, fifth, and sixth passes from the lower left grid to the right. In some cases, there are a plurality of pass allocation patterns for one density level. Hence, index numbers are given to the respective assignment patterns. Note that the assignment patterns shown in FIG. 6 are illustrated using grids for illustrative purpose, and the printer has tables corresponding to these patterns in a memory such as a ROM or the like. For example, each pass allocation pattern is expressed as a table in which passes that print dots are indicated by "1", and passes that do not print any dots are indicated by "0".

For example, three pass allocation patterns are available for level 2 in FIG. 6. In a pattern of index number 1 of level 2, the leftmost grids in the upper and lower columns are painted in black to indicate that dots are printed in passes corresponding to these grids. That is, dots are printed in the first and fourth passes of six scans, and a total of two ink dots are printed on one pixel of interest.

The printing apparatus assigns the patterns shown in FIG. 6 to input image data which has a pixel density of 600 dpi, and in which one pixel can assume five values (to be referred to as 600-dpi, 5-valued data hereinafter) in correspondence with pixel levels upon printing. In case of 6-pass print control, there are 6, 15, 20, and 15 different patterns as pass allocation patterns which respectively print one, two, three, and four dots in a single grid (single pixel). All combinations of patterns may be prepared. However, in order to reduce the memory size and calculation load of the printing apparatus, this embodiment adopts six patterns for level 1, three patterns for level 2, two patterns for level 3, and three patterns for level 4.

Figure 7:
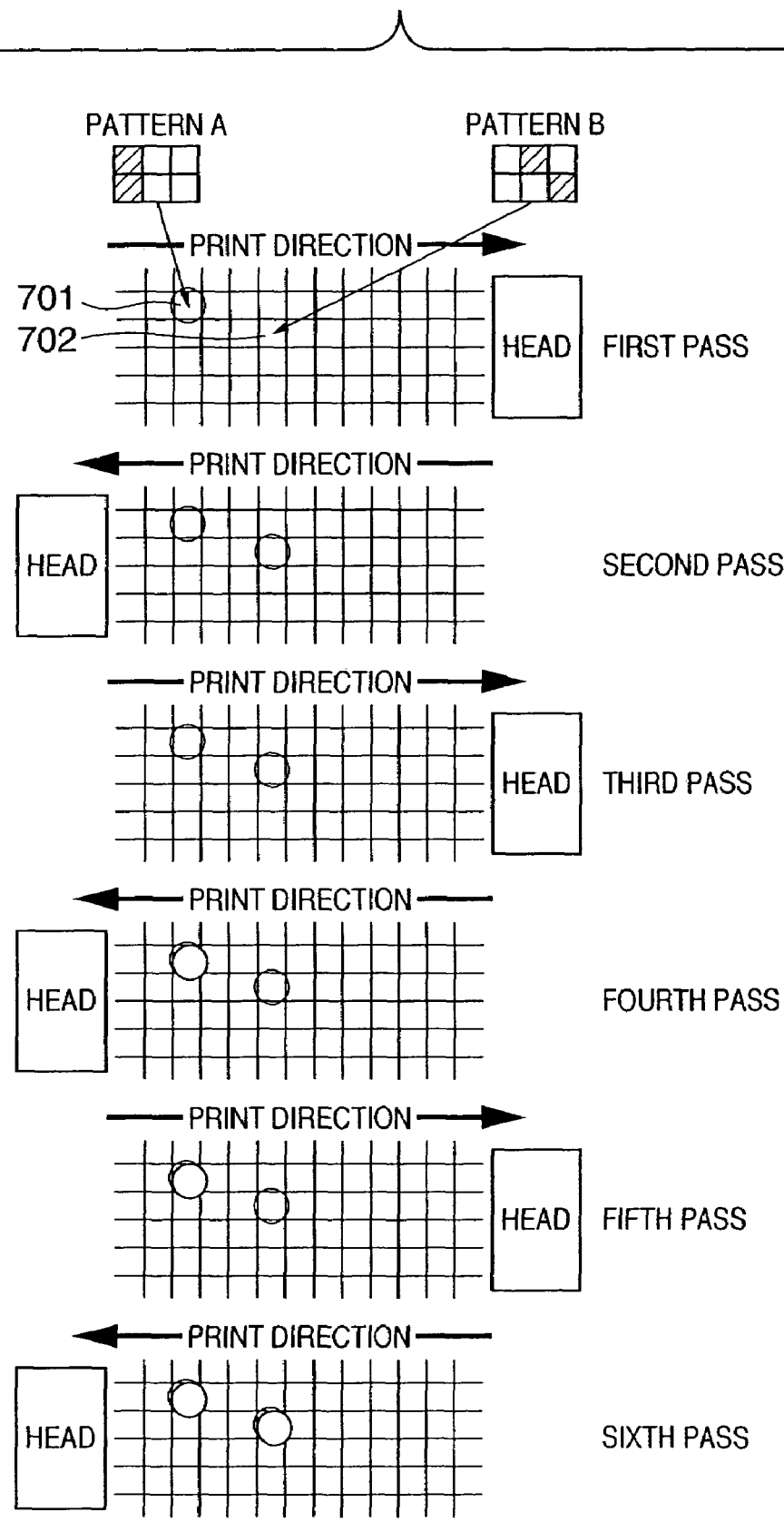
FIG. 7 is a view for explaining the correspondence between a pass allocation pattern display method and corresponding actual print method.

FIG. 7 is a view for explaining the correspondence between the pass allocation pattern display method of this embodiment, and actual, corresponding print method. Pass allocation pattern A of FIG. 7 indicates that dots are printed in the first and fourth passes. Pass allocation pattern B indicates that dots are printed in the second and sixth passes. Note that pattern B is not included in the example shown in FIG. 6. On a pixel 701, dots are printed in accordance with pass allocation pattern A. On a pixel 702, dots are printed in accordance with pass allocation pattern B.

The first pass in FIG. 7 is a forward print scan from the left to the right (a print scan in the forward direction during a main scan). In the first pass, one dot is printed on the pixel 701 according to pattern A. The second pass in FIG. 7 is a backward print scan from the right to the left (a print scan in the backward direction during a main scan). In the second pass, one dot is printed on the pixel 702 according to pattern B. The third pass in FIG. 7 is a forward print scan from the left to the right. In the third pass, no dot is printed. The fourth pass in FIG. 7 is a backward print scan from the right to the left. In the fourth pass, one dot is printed on the pixel 701 according to pattern A. The fifth pass in FIG. 7 is a forward print scan from the left to the right. In the fifth pass, no dot is printed. The sixth pass in FIG. 7 is a backward print scan from the right to the left. In the sixth pass, one dot is printed on the pixel 702 according to pattern B.

Figure 8:
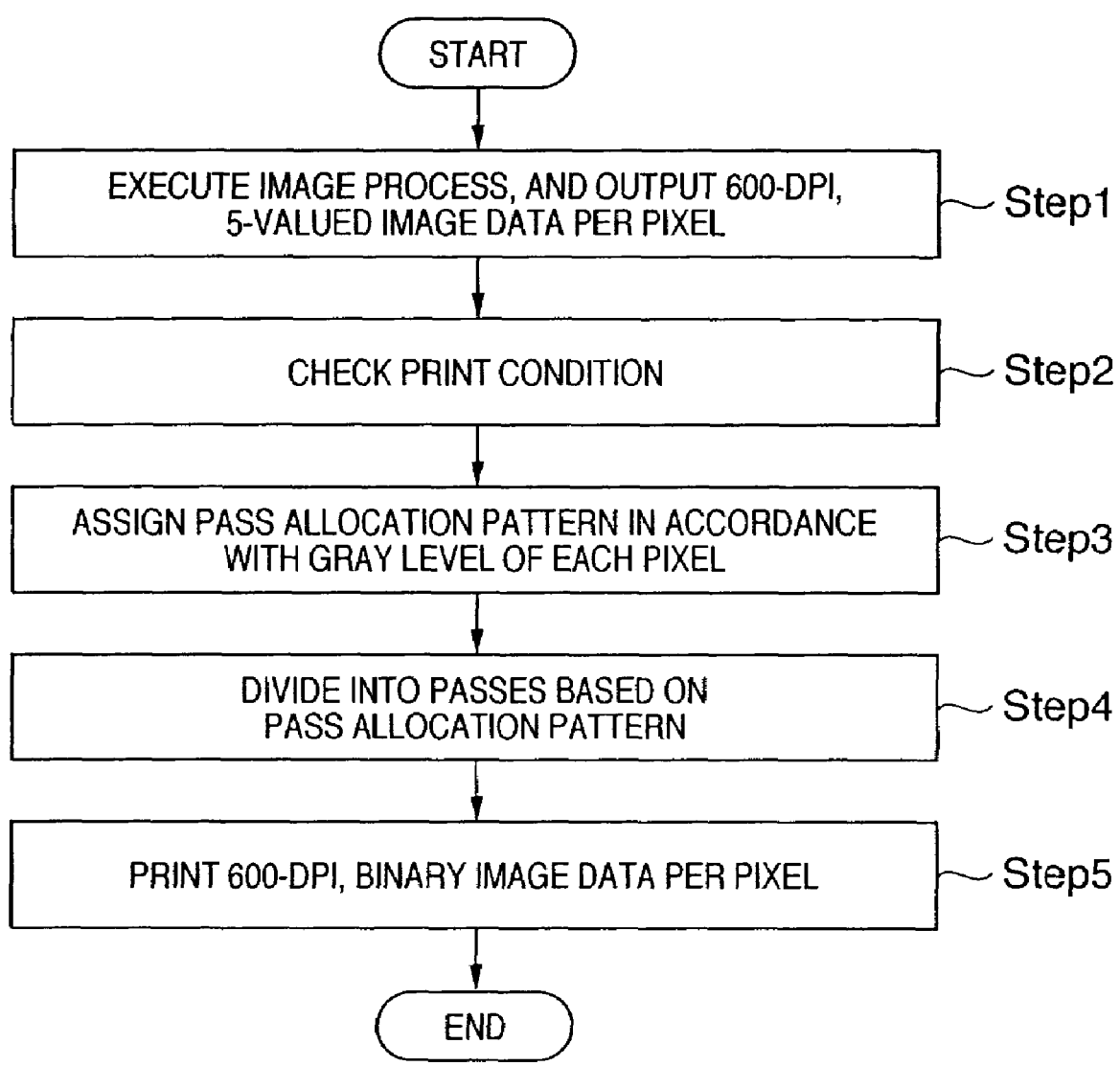
FIG. 8 is a flow chart for explaining details of pass allocation control of the first embodiment.

FIG. 8 is a flow chart for explaining details of the pass allocation control in this embodiment. In step 1, data (e.g., luminance data expressed in 256gray levels) corresponding to an original image to be printed undergoes various image processes to obtain image data, e.g., 600-dpi, 5-valued image data. In this embodiment, 600-dpi, 5-valued data will be exemplified. Of course, the pixel density is not limited to 600 dpi, and the number of gray levels is not limited to five. For example, the pixel density may assume any other values as long as a printer used can print, and the number of gray levels may assume any other values (e.g., two, three, or the like) as long as a printer used can print.

In step 2, a print condition (e.g., the number of print passes) upon printing the image data (600-dpi, 5-valued data) obtained in this way is checked, and a group of pass allocation patterns (e.g., a group of pass allocation patterns shown in FIG. 6) is set on the basis of this print condition. Note that the pass allocation patterns in FIG. 6 correspond to a group of index patterns used in 6-pass print control. In addition to this group, groups of index patterns for 2-to 5-pass print control processes are prepared. That is, groups of pass allocation patterns corresponding to the numbers of passes are prepared in advance. The group of pass allocation patterns corresponding to the number of print passes is selected from these groups, and is set to be used in print control.

Note that the print condition includes, e.g., the type of print medium, print mode (print quality and speed), and the like in addition to the number of print passes (the number of scans). In the above description, the group of pass allocation patterns used is determined in correspondence with the number of print passes, but this embodiment is not limited to this. For example, the group of pass allocation patterns used may be determined in correspondence with the type of print medium and print mode. That is, the number of print passes normally corresponds to the type of print medium (normal paper, high-quality dedicated paper, glossy paper, OHP sheet, and the like) and print mode (fine, standard, quick, and the like). For example, when the print mode is "quick" and the type of print medium is "normal paper", it is determined in advance that the number of print passes is "2". On the other hand, when the print mode is "fine" and the type of print medium is "glossy paper", it is determined in advance that the number of print passes is "6". Also, when the print mode is "standard" and the type of print medium is "high-quality dedicated paper", it is determined in advance that the number of print passes is "4". Therefore, in a printing apparatus in which the number of print passes is automatically determined in correspondence with the type of print medium and print mode, the type of print medium and print mode may be checked as the print condition, and the group of pass allocation patterns used may be determined in correspondence with the type of print medium and print mode. Of course, such determination method is merely an example, and the group of pass allocation patterns according to the print condition may be determined by other methods.

When image data is 600-dpi, 5-valued data, at least four print passes are required to print 5-valued data. However, this embodiments adopts 6-pass print control to sufficiently suppress texture formed due to characteristic variations and the like of the print head in place of the 4-pass print control. Hence, in this example, the number of print passes is set to be "6", and six patterns in maximum are determined as the number of patterns corresponding to one density level.

In step 3, a pass allocation pattern corresponding to the density level of each pixel is assigned to that pixel expressed by a 600-dpi, 5-valued density level. In this case, pass allocation patterns which are determined for each number of passes are assigned in turn. In this example, pass allocation patterns for the 6-pass print control shown in FIG. 6 are used. In this case, one of pass allocation patterns, i.e., one pattern for density level 0, six patterns for density level 1, three patterns for density level 2, two patterns for density level 3, and three patterns for density level 4 is assigned to each pixel in correspondence with the density level of that pixel.

In step 4, the 5-valued image data is segmented for respective passes (first to sixth passes) in accordance with the pass allocation patterns assigned in this way to obtain binary image data to be printed in each pass. For example, if image data is 600-dpi, 5-valued data, 600-dpi binary data to be printed in each pass is obtained. After that, dots are recorded in respective passes on the basis of the 600-dpi binary data generated in correspondence with respective passes.

FIGS. 9A to 9D show the method of assigning pass allocation patterns. FIG. 9A shows random selection ranges from 1 to the number of patterns in correspondence with pixel values (density levels) 1 to 4. That is, assume that the selection range of pass allocation index patterns is the number of pass allocation patterns corresponding to each pixel value, and the probabilities of appearance of a plurality of pass allocation patterns corresponding to an identical pixel value are nearly equal to each other. This embodiment has one pattern for density level 0, six patterns for density level 1, three patterns for density level 2, two patterns for density level 3, and three patterns for density level 4, as shown in FIG. 6. For this reason, in order to randomly select a pass allocation pattern in step 3 in FIG. 8, a pass allocation pattern is randomly selected from index number 1 if the density level of a pixel of interest is "0", index numbers 1 to 6 if the density level is "1", index numbers 1 to 3 if the density level is "2", index numbers 1 and 2 if the density level is "3", and index numbers 1 to 3 if the density level is "4". Since the pass allocation pattern is selected randomly, respective pass allocation patterns are selected at nearly equal probabilities from a plurality of pass allocation patterns corresponding to a given density level. For example, in case of density level 2 in FIG. 6, pass allocation index numbers 1, 2, and 3 are selected at nearly equal probabilities.

FIG. 9B shows image data with a density level sequence "4, 4, 4, 4, 2, 2, 1, 1, 1, 2, . . .". FIG. 9C shows the method of assigning pass allocation patterns to the image data shown in FIG. 9B. For each of the first to fourth pixels of density level 4, one pass allocation pattern corresponding to density level 4 is randomly selected from index numbers 1 to 3. For each of the fifth, sixth, and tenth pixels of density level 2, one pass allocation pattern corresponding to density level 2 is randomly selected from index numbers 1 to 3. For each of the seventh to ninth pixels of density level 1, one pass allocation pattern corresponding to density level 1 is randomly selected from index numbers 1 to 6.

In order to attain random selection, for example, a random number may be generated and divided by the number of patterns to obtain a remainder, and that remainder may be used as an index number.

FIG. 9D shows the assignment results of the pass allocation patterns to respective pixels, i.e., index numbers assigned to the respective pixels. The upper column indicates the density levels of the respective pixels, and the lower column indicates the index numbers of the pass allocation patterns assigned to the respective pixels. That is, index number 1 is assigned to the first pixel, and index number 2 is assigned to the second pixel.

Figures 10A, 10B, 10C:
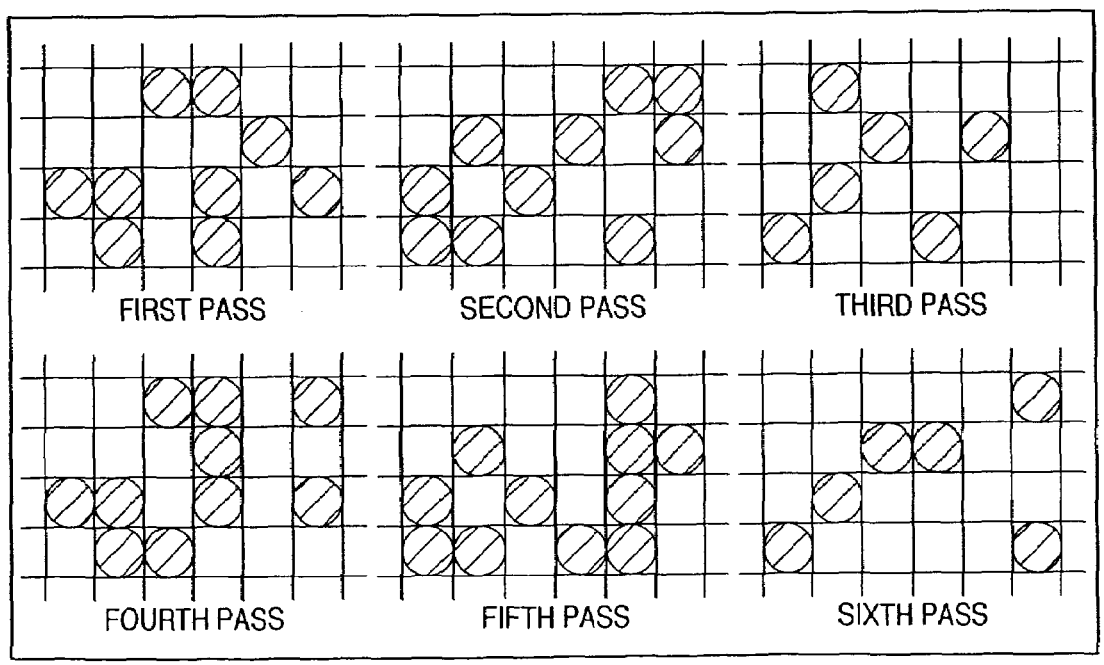
FIGS. 10A and 10B show an example of assignment of pass allocation patterns corresponding to density levels to respective pixels.
FIG. 10C shows dot patterns which are printed in respective passes according to the pattern shown in FIG. 10B.

FIGS. 10A to 10C are views for explaining the flow of image data until dots are printed on a print medium. FIG. 10A shows an example of image data. Numerical values in grids indicate pixel values (density levels). This image data is grayscale value data (5-valued data in this example) obtained after the image processes in step 1 in FIG. 8. Note that numerals indicate the density levels of pixels.

FIG. 10B shows the assignment state of the index numbers of the pass allocation patterns (FIG. 6) in correspondence with the density levels of the respective pixels. That is, FIG. 10B shows the result of the pass allocation pattern assignment process in step 3 in FIG. 8 for the image data shown in FIG.

10A. Of a pair of numerical values connected via a hyphen, the left value indicates the density level of each pixel data of the image data, and the right value indicates the index number of the pass allocation pattern. In this manner, the pass allocation pattern is assigned in correspondence with pixel data.

As the method of assigning the pass allocation patterns, it is effective to use the method of randomly selecting one pass allocation pattern from a plurality of pass allocation patterns corresponding to the density level of a pixel of interest (for example, randomly selecting one pattern from three patterns in case of density level 4), and assigning the selected pattern to the pixel of interest, as shown in FIG. 9. However, other methods may be applied. For example, the following method may be used. That is, the correspondence between the pixel positions and pass allocation patterns is determined in advance for each density level. Then, a pattern to be used is assigned in correspondence with the pixel position and density level of a pixel of interest. More specifically, in case of density level 4, arbitrary patterns of index numbers 1, 2, and 3 are set in advance in correspondence with the first, second, third, ..., N-th pixel positions from the left end. For example, if the density level is "4" and the pixel position is the second position from the left end, a pass allocation pattern of index number 2 is assigned.

FIG. 10C shows a state wherein all dots to be printed using the pass allocation patterns assigned in this way are divided into dots to be printed in each pass. This data corresponds to that obtained as a result of the process in step S4 in FIG. 8 (i.e., a process for dividing print data into data for each print pass). Since a pixel 10B1 at the left end in the uppermost column in FIG. 10B has density level 0, it is not recorded in any of the first to sixth passes. Since a pixel 10B2 in FIG. 10B has density level 1 and a pass allocation pattern of index number 3 in FIG. 6 is selected, a dot is printed in the third pass. Since a pixel 10B3 in FIG. 10B has density level 2, and a pass allocation pattern of index number 1 in FIG. 6 is selected, dots are printed in the first and fourth passes. The same applies to other pixel data, i.e., a dot or dots are recorded in the m-th (m=1 to 6 in this embodiment) pass or passes defined in a pass allocation pattern corresponding to the selected index number. Note that the first pass means the first one of a plurality of passes in an image print process for a given raster, and the second pass, third pass, ... similarly mean the second one, third one, ..., of them.

In case of multi-pass print control, it is a common practice to divide the height of a head by the number of passes, and to convey a paper sheet by each divided height per scan. For this reason, a region (called a band) printed in a series of scans includes a partial region of the first scan to a partial region of the last scan. These partial regions have an equal height, and are divided along the scan direction. For example, assume that the number of passes is 6. In such case, the region to be printed in a series of head scans is divided into six in the height direction, i.e., six partial regions for the sixth, fifth, fourth, third, second, and first scans in turn from the uppermost position. Therefore, for a region to be printed in the i-th scan, a grid value corresponding to the i-th pass in a pass allocation pattern is selected and is set as binary data to be printed in the i-th pass.

Figure 11:
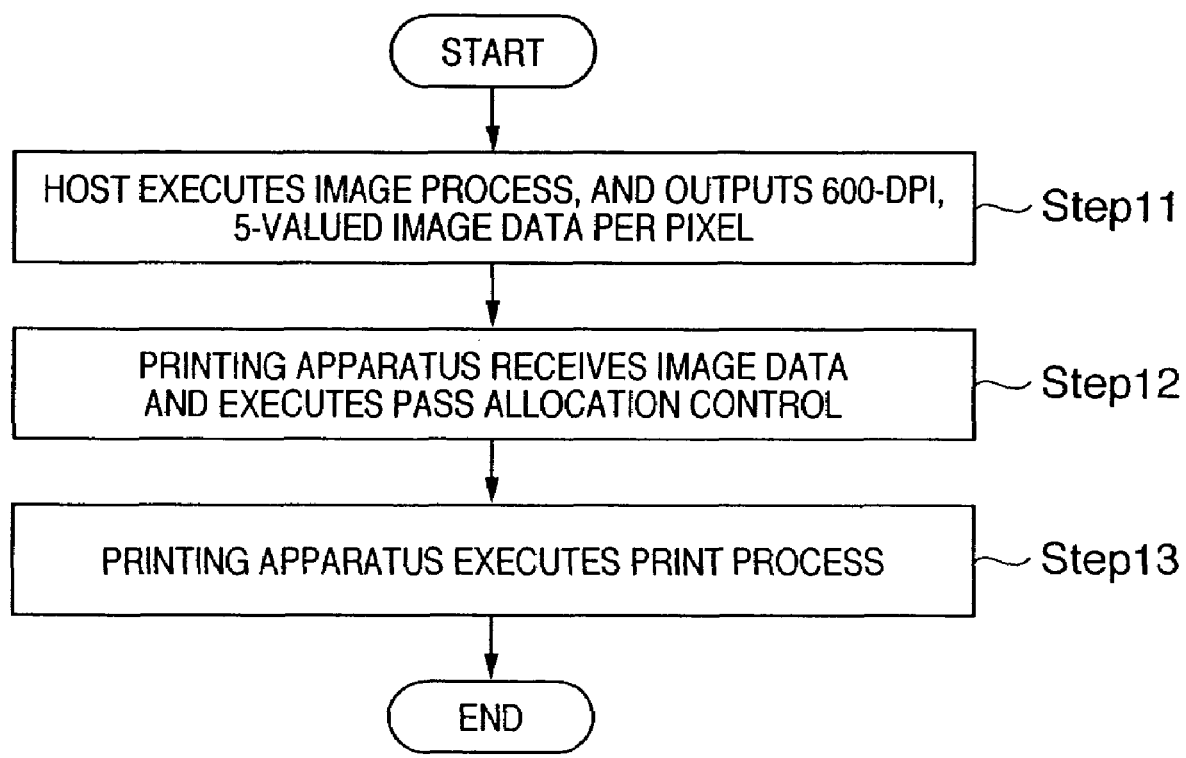
FIG. 11 is a flow chart showing pass allocation control executed on the printing apparatus side.

The assignment control of pass allocation patterns may be done either on the host side or the printing apparatus (printer) side. FIG. 11 is a flow chart upon executing the pass allocation control on the printing apparatus side. The host executes various required image processes for data (e.g., luminance data expressed in 256 gray levels) corresponding to an original image to be printed to acquire predetermined image data (e.g., 600-dpi, 5-valued image data), and outputs that 5-valued data to the printing apparatus in step 11. In step 12, the printing apparatus executes pass allocation control. This pass allocation control process corresponds to steps 2, 3, and 4 in FIG. 8. In the control process in step 12, the 600-dpi, 5-valued image data transmitted from the host is divided into binary data for respective passes in correspondence with a pass allocation pattern to obtain print data (600-dpi binary image data) for respective passes, each of which indicates ejection/non-ejection of ink. In step 13, the printing apparatus controls the print head to eject ink on the basis of the 600-dpi, binary image data after the pass allocation control, which are obtained in step 12, thus printing an image formed by a plurality of dots on a print medium.

By executing the pass allocation control using the pass allocation index patterns according to this embodiment, a process for dividing image data into data for respective passes can be implemented by a simple arrangement. In this case, since the pass allocation control is executed on the printing apparatus side, the image processes in the host can be the same as those to be executed for a conventional printing apparatus.

Figure 12:
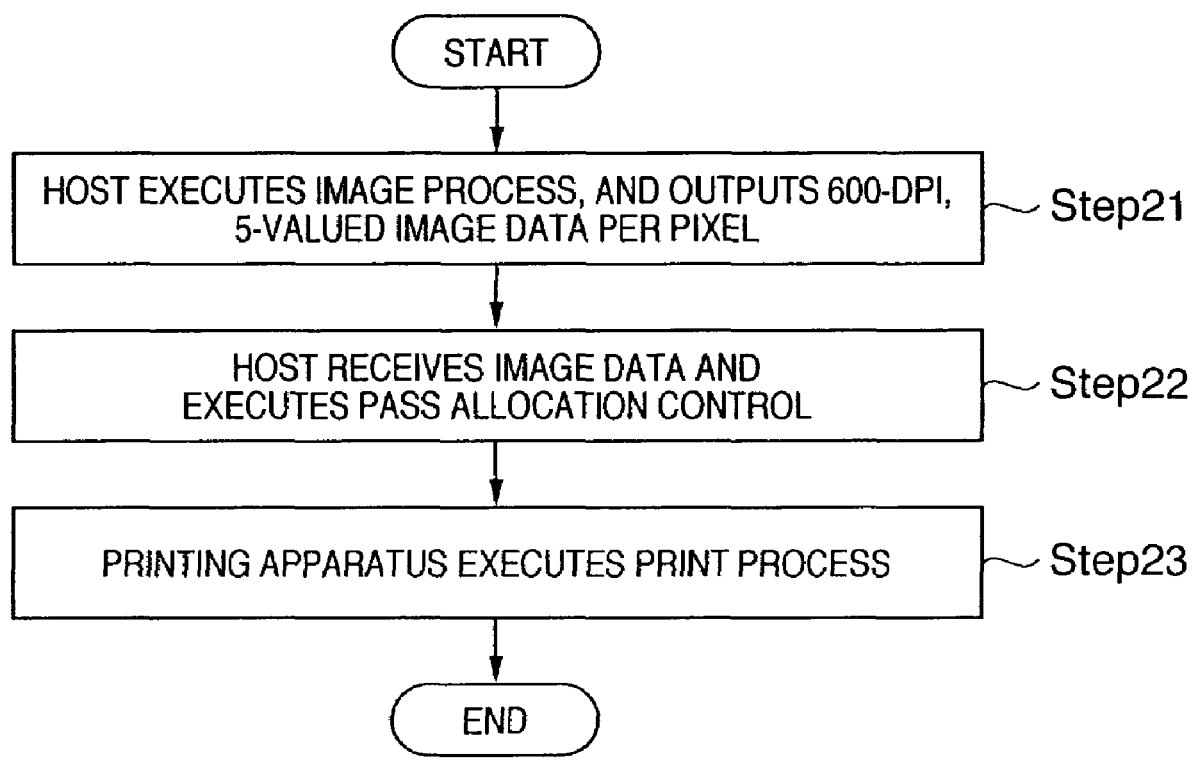
FIG. 12 is a flow chart showing pass allocation control executed on the host side.

FIG. 12 is a flow chart upon executing the pass allocation control on the host side. The host executes various required image processes for data (e.g., luminance data expressed in 256 gray levels) corresponding to an original image to be printed to acquire predetermined image data (e.g., 600-dpi, 5-valued image data), and outputs that 5-valued data to the printing apparatus in step 21. In step 22, the host executes pass allocation control. This pass allocation control process corresponds to steps 2, 3, and 4 in FIG. 8. In this control process, the 600-dpi, 5-valued image data transmitted from the host is divided into binary data for respective passes in correspondence with a pass allocation pattern to acquire print data (600-dpi binary image data) for respective passes, each of which indicates ejection/non-ejection of ink, and the binary data are output to the printing apparatus. In step 23 executed by the printing apparatus, the print head is controlled to eject ink on the basis of the 600-dpi, binary image data output in step 22, thus printing an image formed by a plurality of dots on a print medium. In this case, compared to a case wherein the pass allocation control is executed on the printing apparatus side, since 600-dpi, binary image data equal to the output resolution of the printing apparatus are sent from the host to the printing apparatus, the printing apparatus need not process data, and a print buffer for one scan need only be prepared. Hence, the printing apparatus can adopt a very simple arrangement. Note that the pixel density of image data generated by a host computer is selected in correspondence with the print resolution of the printing apparatus.

As described above, according to this embodiment, pass allocation control that determines "which of a plurality of passes is used to print each pixel data that forms image data" is executed by assigning, to each pixel, a pass allocation pattern selected in accordance with the pixel value of that pixel.

As a result, this embodiment can execute a data allocation operation for respective passes, generate binary data for the respective passes, and execute a print process using a simpler arrangement than the conventional arrangement. That is, upon printing each pixel, the conventional arrangement selects a dot pattern corresponding to the pixel value of that pixel, and executes an allocation operation to respective passes by executing a decimation mask process. That is, the selection operation of a dot pattern corresponding to the pixel value, and the pass allocation operation are independently executed. For this reason, the processing time is relatively long.

In addition, a memory that stores the decimation mask is required, thus increasing the memory size accordingly.

By contrast, in the invention according to this embodiment, a pass allocation pattern is designed to have (a) dot pattern information corresponding to a pixel value, and (b) pass designation information used to designate which of passes is used to print a dot, and such pass allocation pattern is assigned to each pixel. For this reason, the selection operation of a dot pattern corresponding to the pixel value and the allocation operation to respective passes can be simultaneously executed, thus greatly shortening the processing time. Therefore, in this embodiment, the processing time can be shortened compared to the conventional arrangement, i.e., "selection of a dot pattern corresponding to a pixel value"+"data allocation to respective passes by a decimation mask process". Furthermore, even when the pass division process is executed either by the host or printing apparatus, the arrangement of the printing apparatus can be simplified. Since no decimation mask is required, the memory size can be reduced accordingly.

For a given number of print passes, a plurality of pass allocation patterns are defined for each density level, and one pattern is randomly selected from those patterns. Hence, all dots of an identical gray level, which belong to one raster, can be prevented from being printed by an identical nozzle of the print head. For this reason, texture formed due to different nozzle characteristics or nozzle ejection errors can be reduced.

Second Embodiment

In this embodiment, more preferred pass allocation patterns will be explained. This embodiment is substantially the same as the first embodiment, except that pass allocation patterns shown in FIG. 18 are used in place of those shown in FIG. 6. A feature of the pass allocation patterns of this embodiment lies in that deterioration of an image due to reciprocal print scans hardly occurs.

<Improvements in Patterns of FIG. 6>

Figure 13A:
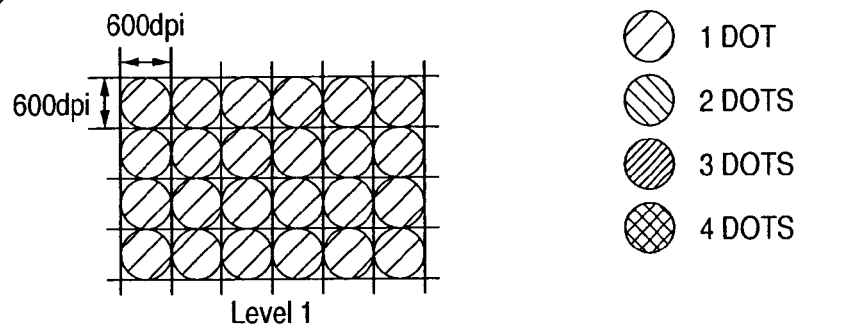
FIGS. 13A to 13D show the image results of respective gray levels using the pass allocation patterns of the third embodiment.
Figure 13B:
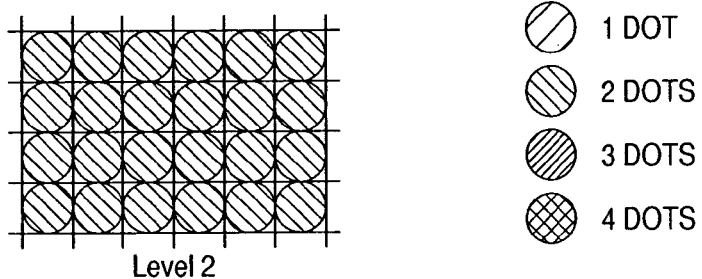
Figure 13C:
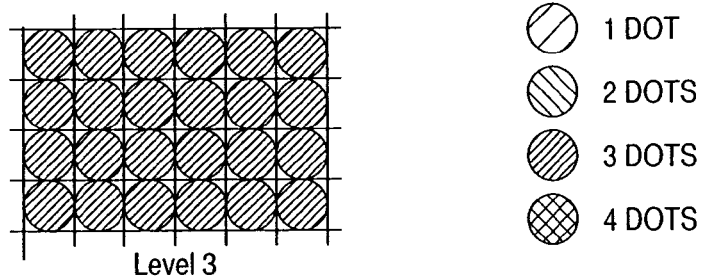
Figure 13D:
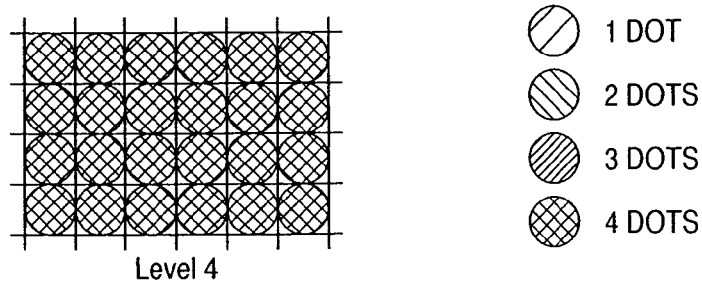

FIGS. 13A to 13D show uniform images of density levels 1 to 4 which are printed using the pass allocation patterns of FIG. 6. Each basic grid point indicates a pixel size printed at 600 dpi. The image of level 1 shown in FIG. 13A is printed by forming one dot on each basic grid point, the image of level 2 shown in FIG. 13B is printed by forming two dots on each basic grid point to overlap each other, the image of level 3 shown in FIG. 13C is printed by forming three dots on each basic grid point to overlap each other, and the image of level 4 shown in FIG. 13D is printed by forming four dots on each basic grid point to overlap each other.

When the 6-pass print control is combined with reciprocal print control, the first, third, and fifth passes are printed in forward scans, and the second, fourth, and sixth passes are printed in backward scans. FIGS. 14A to 14D show examples of the dot layouts and densities to be printed in the forward and backward print scans in correspondence with the images shown in FIGS. 13A to 13D. The forward and backward print scans in FIGS. 14A to 14D have a complementary relationship, and an original image is completed by overlapping them. As can be seen from FIG. 6, for levels 2 and 4, dots to be printed in respective passes are different depending on the pass allocation patterns to be selected. However, in any of these patterns, the number of print scans of even passes is equal to the number of print scans of odd passes. For this reason, by overlapping the even and odd passes each other, dots are printed at the same density in the forward and backward print scans.

By contrast, for levels 1 and 3, the number of print scans of even passes is not equal to the number of print scans of odd passes. For this reason, upon overlapping the even and odd passes, dots printed in the forward and backward print scans have different densities depending on selected pass allocation patterns. For example, in level 3 of FIG. 6, if a pass allocation pattern corresponding to index number 1 is selected for a given pixel, that pixel is printed in odd passes alone. On the other hand, if a pass allocation pattern corresponding to index number 2 is selected, that pixel is printed in even passes alone. These patterns are randomly selected at an equal ratio.

Figure 14A:
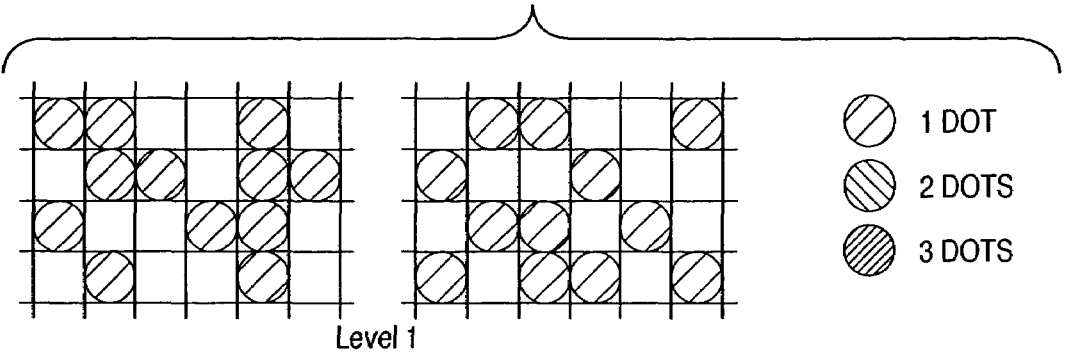
FIG. 14A shows an example of dot layouts printed in forward print scans of the first, third, and fifth passes, and backward print scans of the second, fourth, and sixth passes upon forming a uniform image of level 1 using the pass allocation patterns of the first embodiment.
Figure 14B:
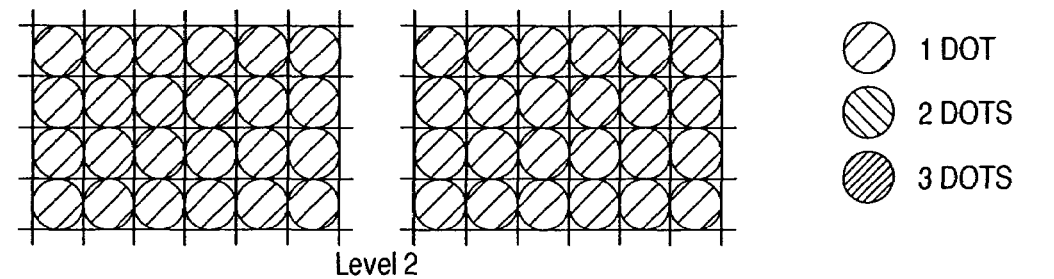
FIG. 14B shows an example of dot layouts printed in forward print scans of the first, third, and fifth passes, and backward print scans of the second, fourth, and sixth passes upon forming a uniform image of level 2 using the pass allocation patterns of the first embodiment.
Figure 14C:
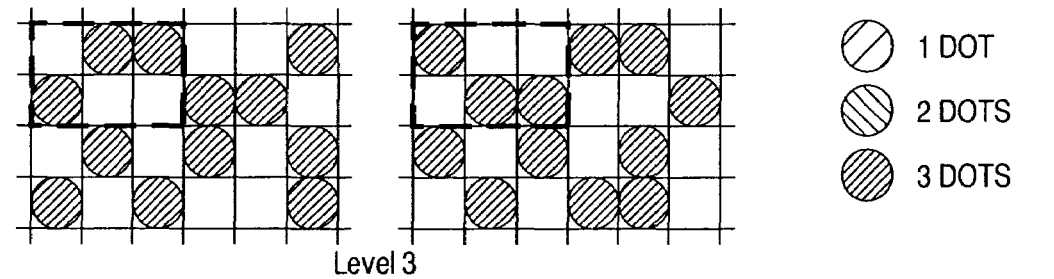
FIG. 14C shows an example of dot layouts printed in forward print scans of the first, third, and fifth passes, and backward print scans of the second, fourth, and sixth passes upon forming a uniform image of level 3 using the pass allocation patterns of the first embodiment.
Figure 14D:
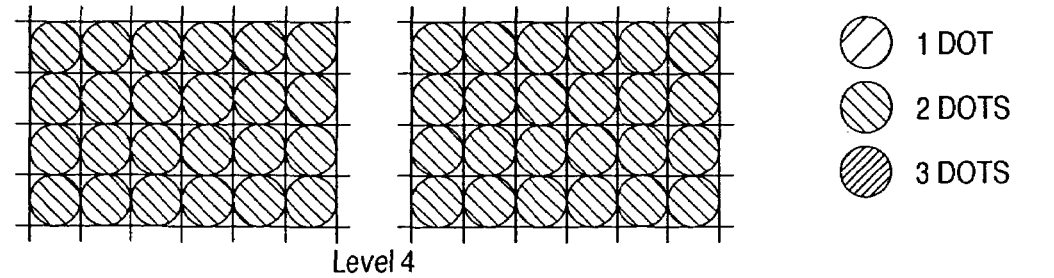
FIG. 14D shows an example of dot layouts printed in forward print scans of the first, third, and fifth passes, and backward print scans of the second, fourth, and sixth passes upon forming a uniform image of level 4 using the pass allocation patterns of the first embodiment.

FIGS. 14A to 14D show such drawbacks. That is, in FIG. 14A, the left image indicates pixels printed in odd passes, and the right image indicates those printed in even passes in the uniform image of level 1. These images include pixels which are printed once in odd passes and those which are printed once in even passes depending on selected pass allocation patterns. In FIG. 14B, the left image indicates pixels printed in odd passes, and the right image indicates those printed in even passes in the uniform image of level 2. Independently of selected pass allocation patterns, dots are printed once each in the odd and even passes. In FIG. 14C, the left image indicates pixels printed in odd passes, and the right image indicates those printed in even passes in the uniform image of level 3. These images include pixels which are printed three times in odd passes and those which are printed three times in even passes depending on selected pass allocation patterns. In FIG. 14D, the left image indicates pixels printed in odd passes, and the right image indicates those printed in even passes in the uniform image of level 4. Independently of selected pass allocation patterns, dots are printed twice each in the odd and even passes.

Figure 15A:
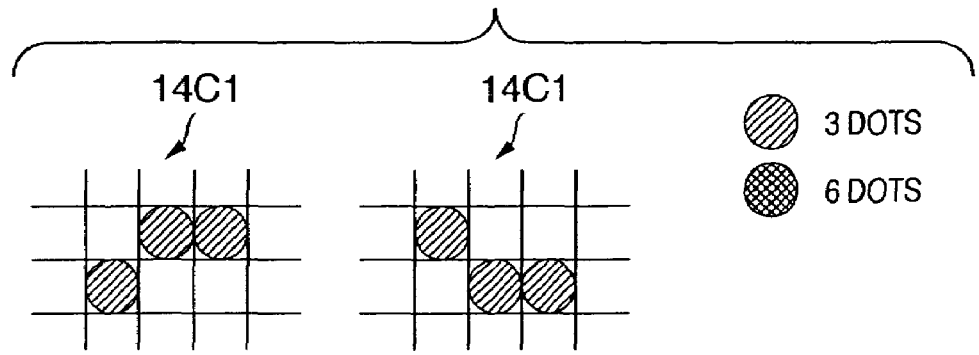
FIGS. 15A to 15D are explanatory views when forward and backward scans have suffered some register error.

FIGS. 15A to 15D are explanatory views when print positions in forward and backward scans have deviated, i.e., print positions in odd and even passes have deviated. FIG. 15A illustrates portions 14C1 and 14C2 extracted from FIG. 14C.

Figure 15B:
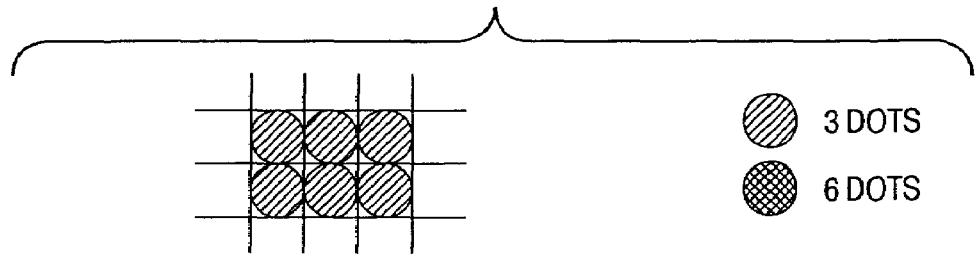
Figure 15C:
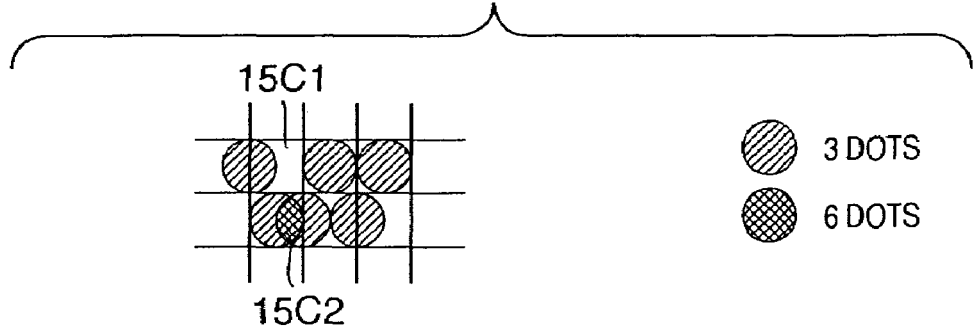

FIG. 15B shows the print result when the forward and backward print positions match. In this case, three dots are printed in each grid to overlap each other. FIG. 15C shows the print result when the forward and backward print positions have deviated 0.5 pixels. This deviation has occurred in the left direction in the backward print scan. Since dots printed in the backward scan have deviated 0.5 pixels to the left with respect to those printed in the forward scan, a light portion for 0 dot (no dot is printed) is formed in a portion 15C1, and a dark portion for six dots (dots are printed six times to overlap each other) is formed in a portion 15C2.

Figure 15D:
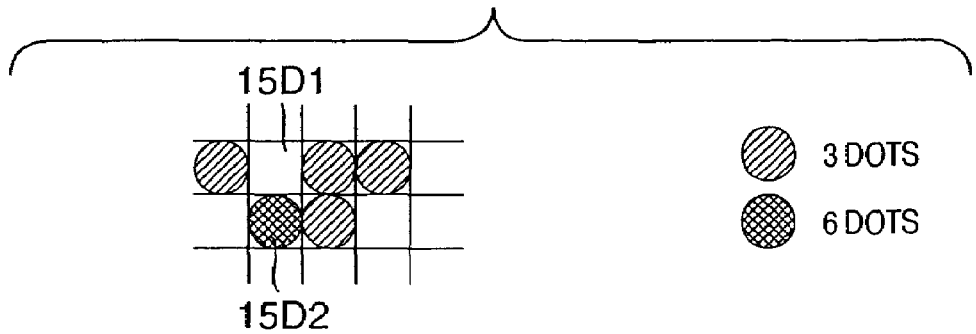

FIG. 15D shows the print result when the forward and backward print positions have deviated one pixel. Since dots printed in the backward scan have deviated one pixel to the left with respect to those printed in the forward scan, a light portion for 0 dot is formed in a portion 15D1, and a dark portion for six dots is formed in a portion 15D2.

If an image is free from such positional deviation in the forward and backward print scans, a pixel of level 3 is printed as overlap of three dots. However, if an image suffers any positional deviation in the forward and backward print scans, a pixel of level 3 is printed as overlap of zero, three, or six dots depending on the degree of overlap of dots printed in the forward and backward scans. For this reason, the uniformity of a pattern is lost, and image granularity (texture) is produced, thus deteriorating the image quality.

Figure 16:
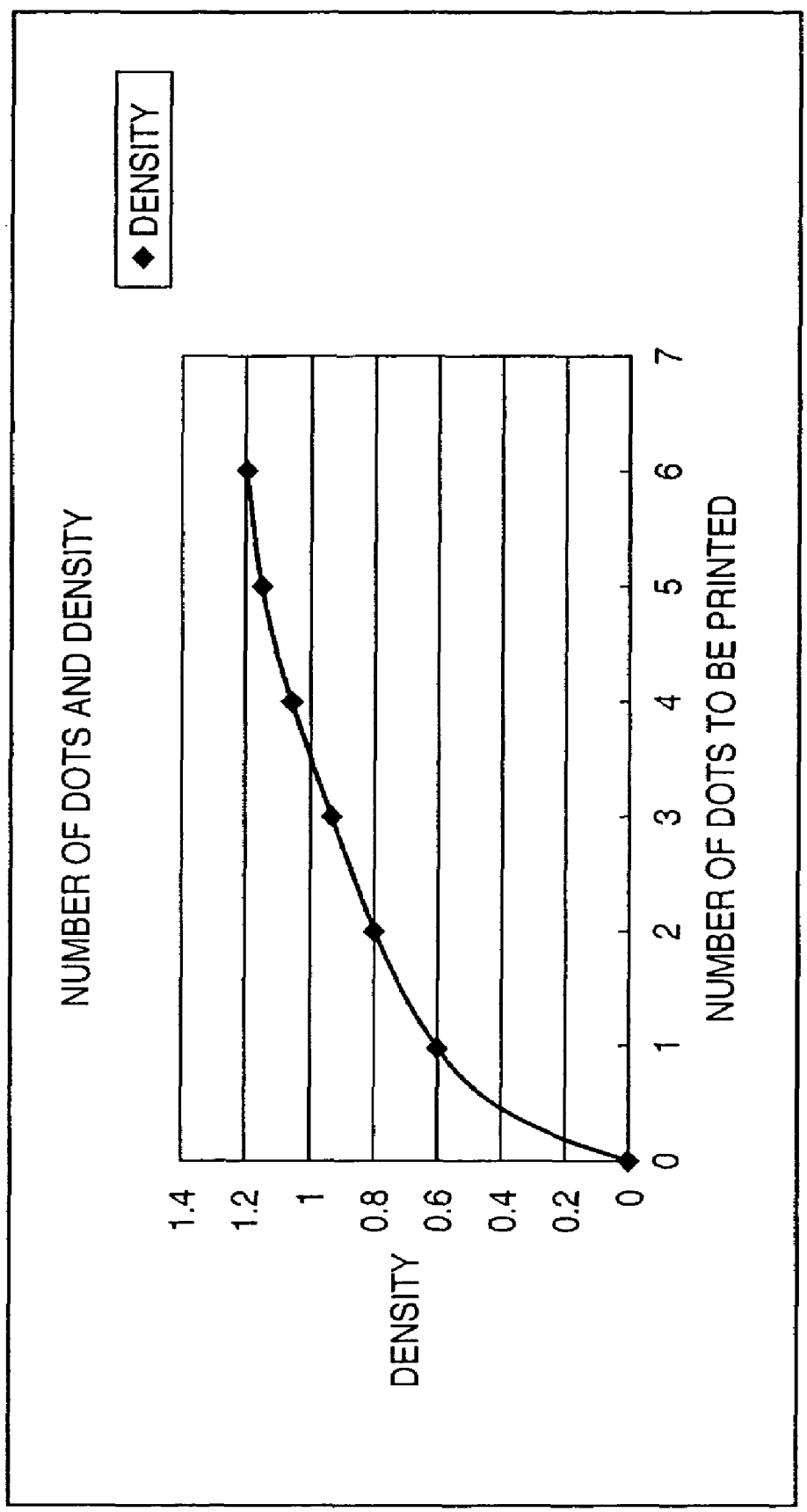
FIG. 16 is a graph showing the relationship between the number of dots to be printed to overlap each other, and the density.
Figure 17A:
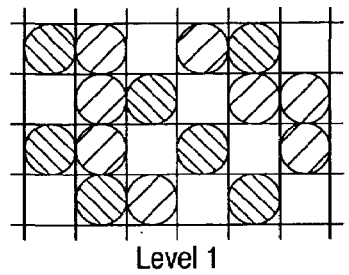
FIGS. 17A to 17D show a case wherein forward and backward scans have suffered some register error in the pass allocation patterns of the first embodiment.
Figure 17B:
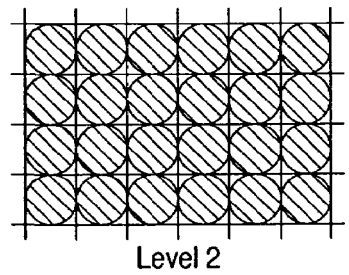
Figure 17C:
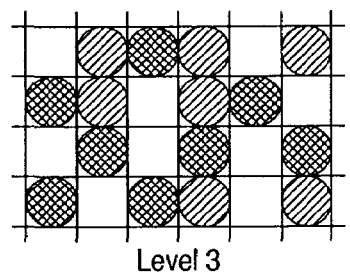
Figure 17D:
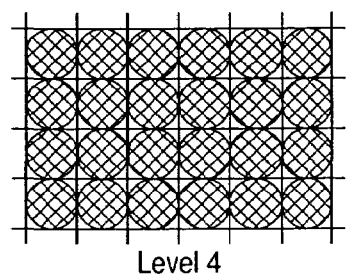
Figure 19A:
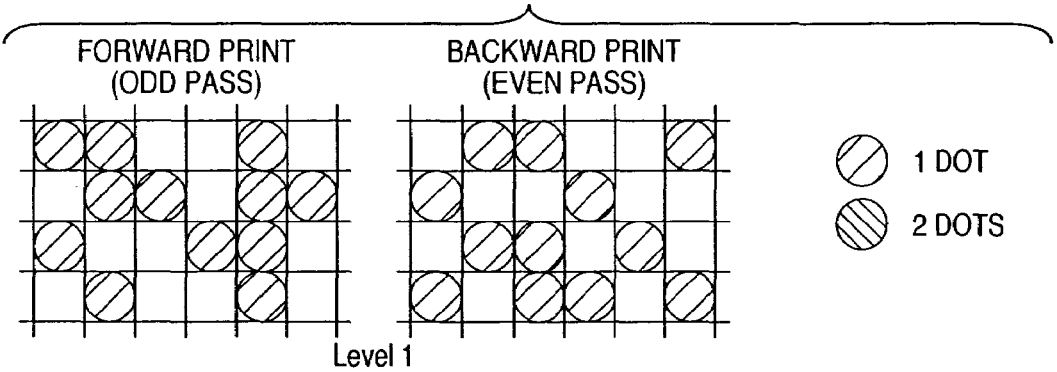
FIGS. 19A to 19D show dot layouts printed in forward print scans of the first, third, and fifth passes and backward print scans of the second, fourth, and sixth passes of the pass allocation patterns of the third embodiment.
Figure 19B:
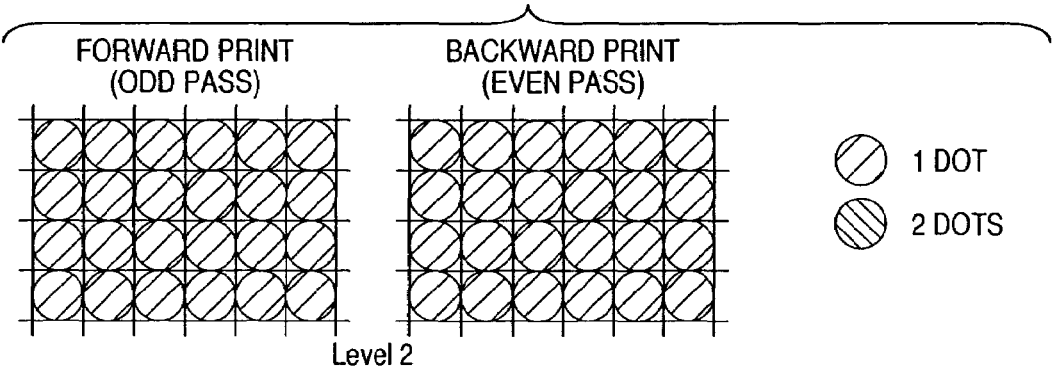
Figure 19C:
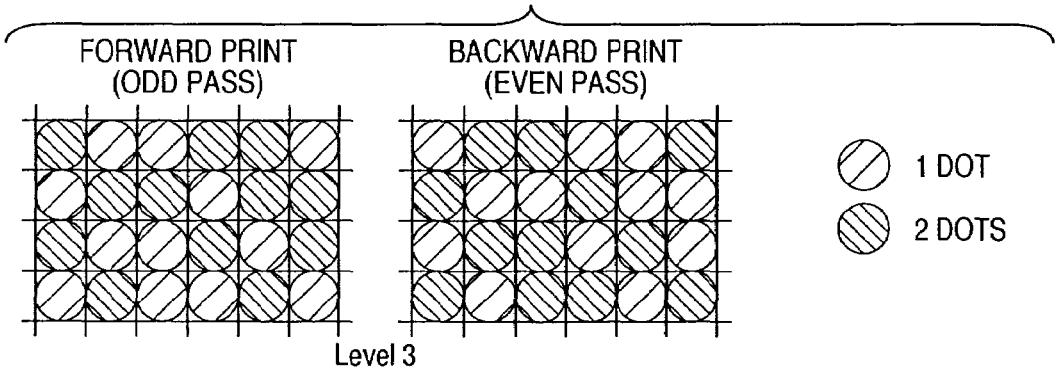
Figure 19D:
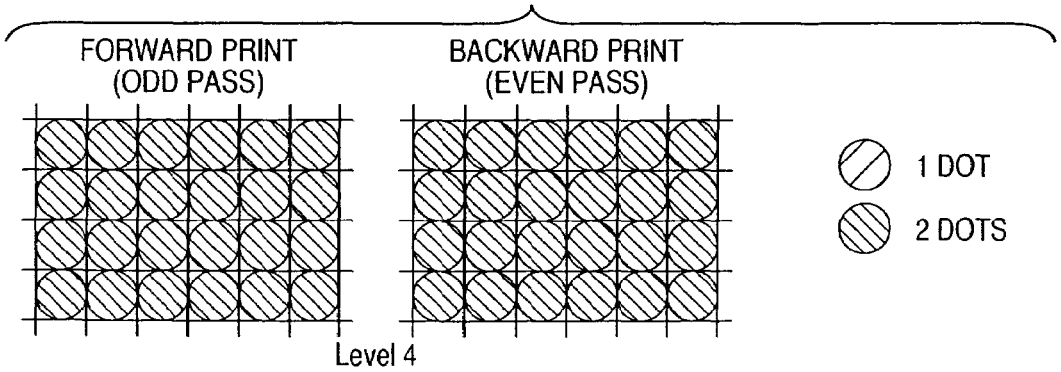

FIG. 16 is a graph showing the relationship between the number of dots to be printed to overlap each other, and the density. When zero, one, and two dots are printed to overlap each other, the density difference between zero dot and one dot is largest, as shown in FIG. 16. For this reason, when the portion 15D1 in FIG. 15D where no dot is printed is formed, image deterioration is most serious.

FIGS. 17A to 17D show images each obtained by overlapping the pattern (left) printed in the forward scan and the pattern (right) printed in the backward scan shown in FIGS. 14A to 14D while being shifted by one pixel. That is, FIGS. 17A to 17D show images printed as that shown in FIG. 15D. In level 1 (FIG. 17A) and level 3 (FIG. 17C), dot overlap portions and dot-less portions are generated, as described above, thus producing texture.

<More Preferred Pass Allocation Index Patterns>

FIG. 18 shows pass allocation patterns according to the second embodiment of the present invention. For level 2 or higher, i.e., levels that require to print two or more dots to overlap each other in a single grid point, pass allocation patterns in which dots are distributed to both the forward print scans (even passes) and backward print scans (odd passes) are defined. That is, for level 3, three patterns from index numbers 1 to 3 are defined. For one pixel, if a pattern of index number 1 is selected, dots are printed in the first, third, and sixth passes; if a pattern of index number 2 is selected, dots are printed in the first, second, and fourth passes; and if a pattern of index number 3 is selected, dots are printed in the second, third, and fifth passes.

For this reason, for level 2 or higher, at least one dot is printed in each of the forward and backward print scans.

FIGS. 19A to 19D show dot layouts printed in respective directions, i.e., in forward scans of the first, third, and fifth passes, and backward scans of the second, fourth, and sixth passes, when the pass allocation patterns shown in FIG. 18 are used. As can be seen from comparison between the dot layouts of level 3 in FIGS. 14C and 19C, pixels are formed by zero dot and three dots in both the forward and backward print scans in FIG. 14C, while pixels are formed by one dot and two dots in both the forward and backward print scans in FIG. 19C.

FIGS. 20A to 20D show examples of images formed when the forward and backward print positions have deviated one pixel using the pass allocation patterns shown in FIG. 18. FIGS. 17A to 17D show examples of images formed when the forward and backward print positions have deviated one pixel using the pass allocation patterns shown in FIG. 6. As can be seen from comparison between the image shown in FIG. 20C, which is formed of pixels of level 3, and the image shown in FIG. 17C of these images, the image in FIG. 17C includes pixels of zero dot, three dots, and six dots, while the image in FIG. 20C include pixels of two dots, three dots, and four dots. The maximum density difference in FIG. 17C corresponds to six dots as the difference between zero dot and six dots, while the maximum density difference in FIG. 20C corresponds to two dots as the difference between two dots and four dots. For this reason, even when the forward and backward print positions have deviated, generation of considerable texture can be suppressed, thus minimizing deterioration of an image.

In this way, since the pass allocation patterns in which dots are allocated in both the forward and backward scans are used to print pixels having a pixel value of level 2 or higher, even when the print positions have deviated, considerable deterioration of an image can be suppressed.

Third Embodiment

This embodiment will explain a method of suppressing generation of texture for level 1. Note that this embodiment is substantially the same as the first embodiment, except for pass allocation patterns.

Figure 21:
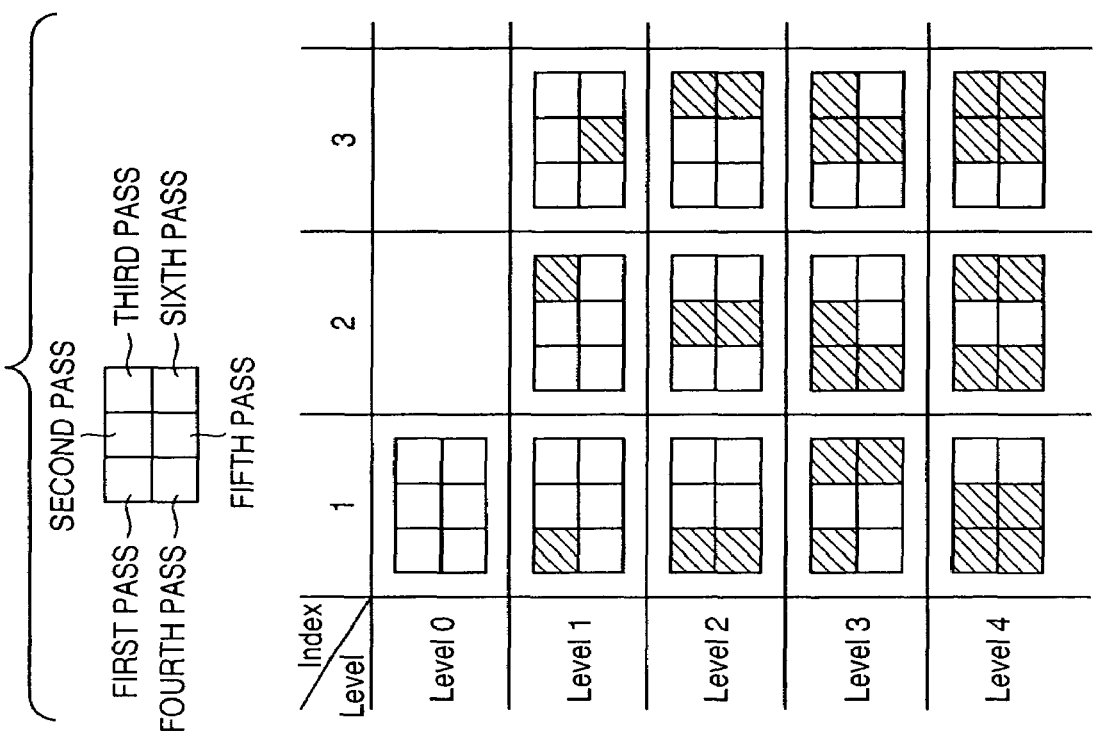
FIG. 21 shows pass allocation patterns of the third embodiment.
Figure 22A:
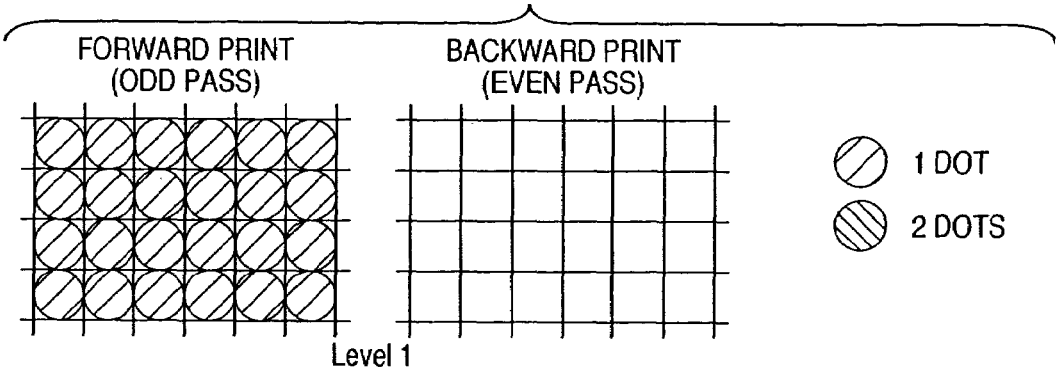
FIGS. 22A to 22D show dot layouts printed in forward print scans of the first, third, and fifth passes and backward print scans of the second, fourth, and sixth passes using the pass allocation patterns of the third embodiment.
Figure 22B:
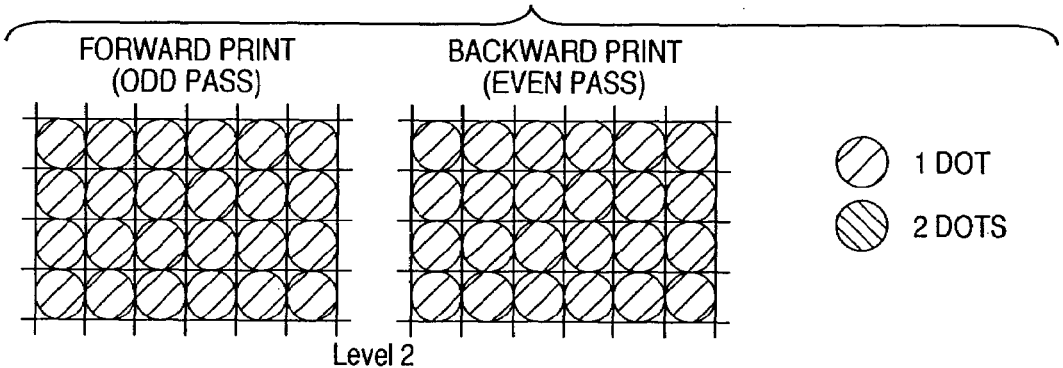
Figure 22C:
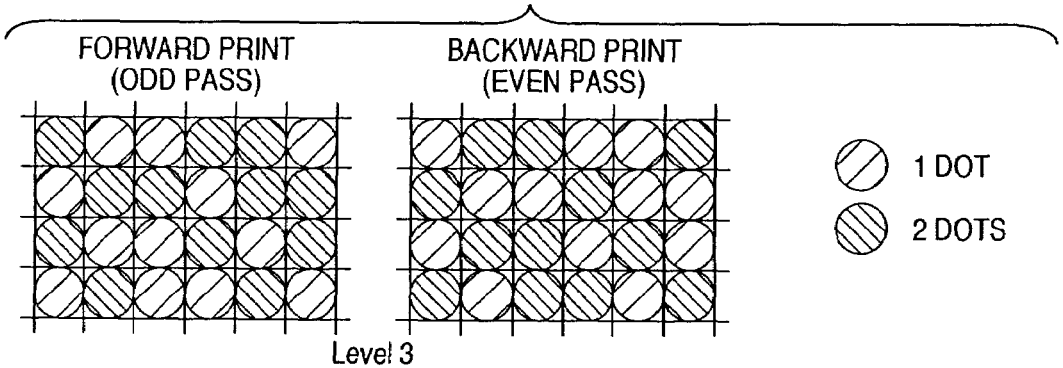
Figure 22D:
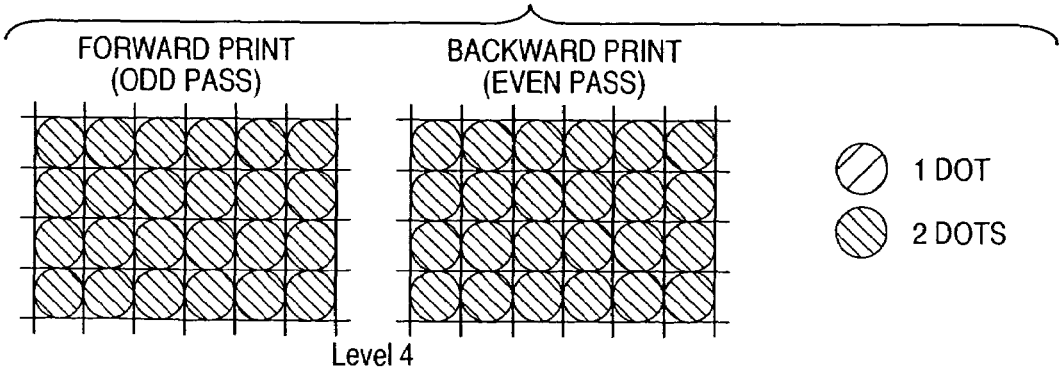
Figure 23A:
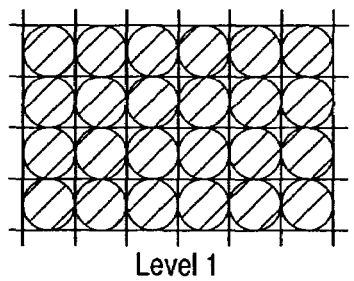
FIGS. 23A to 23D show a case wherein forward and backward scans have suffered some register error in the pass allocation patterns of the third embodiment.
Figure 23B:
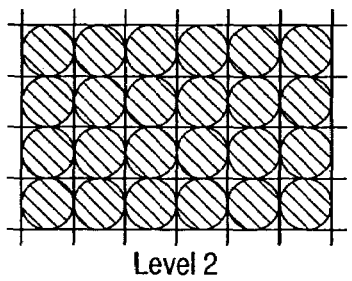
Figure 23C:
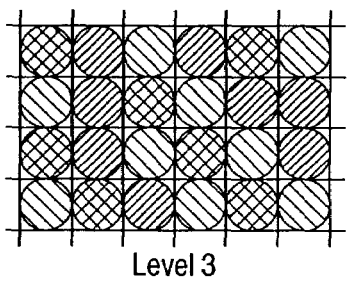
Figure 23D:
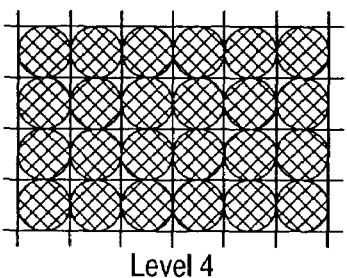

FIG. 21 shows pass allocation patterns according to the third embodiment of the present invention. With the pass allocation patterns of FIG. 21, pixels of level 1 are printed only in odd passes (forward passes). FIGS. 22A to 22D show dot layouts printed in forward scans of the first, third, and fifth passes, and backward scans of the second, fourth, and sixth passes upon printing images of density levels 1 to 4 using the pass allocation patterns shown in FIG. 21. The left pattern in each of FIGS. 22A to 22D is printed in the forward scan, and the right pattern is printed in the backward scan. An image of level 1 shown in FIG. 22A is free from the influences of any positional deviations between the forward and backward scans since it is printed in only the backward scan.

Figure 20A:
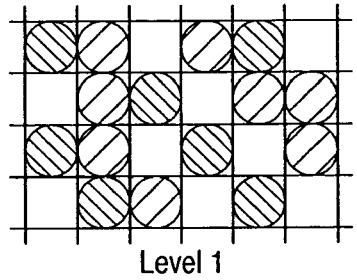
FIGS. 20A to 20D show a case wherein forward and backward scans have suffered some register error in the pass allocation patterns of the third embodiment.
Figure 20B:
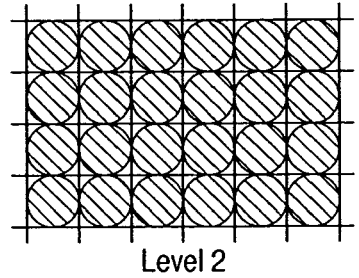

FIGS. 23A to 23D show images formed when the forward and backward print positions have been deviated upon printing using the pass allocation patterns shown in FIG. 21. As can be seen from FIG. 23A, texture generated in FIG. 20A is suppressed. This is because FIG. 20A includes pixels as a combination of zero, one, and two dots, while FIG. 23A includes all pixels of one dot.

Using the pass allocation patterns that allocates dots to only passes of the forward or backward scans, considerable deterioration of an image can be suppressed even when the print positions have been deviated.

Fourth Embodiment

This embodiment will explain a method of further reducing density nonuniformity generated in an image of level 3. Note that the arrangement of this embodiment is substantially the same as that of the first embodiment, except for pass allocation patterns.

FIG. 24 shows pass allocation patterns of the fourth embodiment. For level 3, nine patterns are defined. All these patterns are designed to print each pixel of level 3 by printing dots twice in odd passes, and once in an even pass.

Figure 25A:
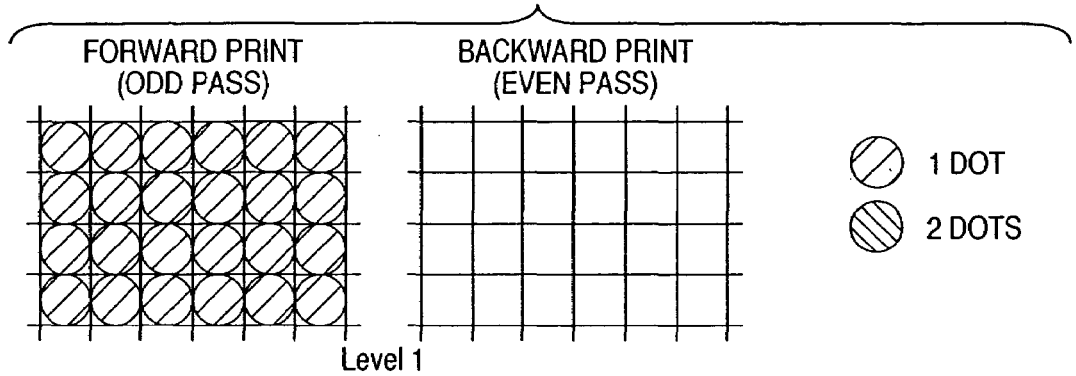
FIGS. 25A to 25D show dot layouts printed in forward print scans of the first, third, and fifth passes and backward print scans of the second, fourth, and sixth passes using pass allocation patterns of the fourth embodiment.
Figure 25B:
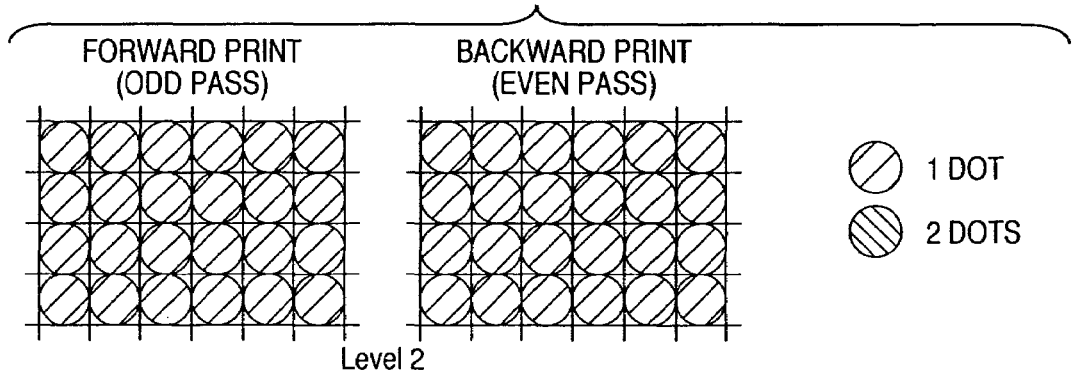
Figure 25C:
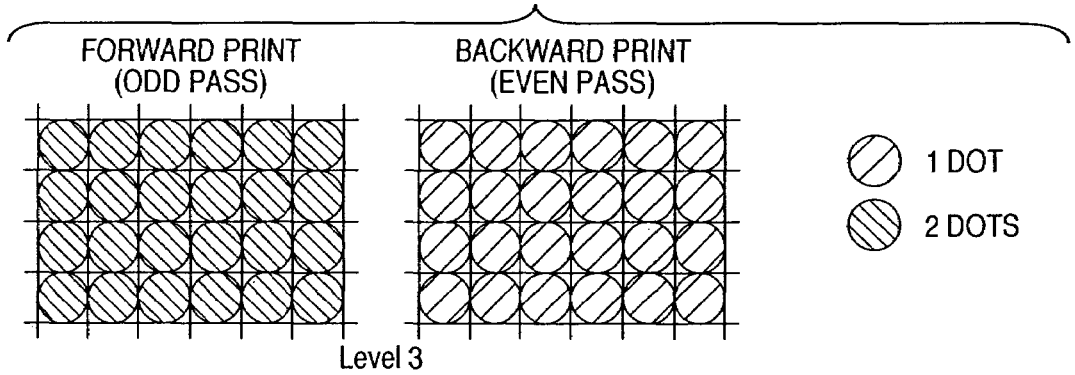
Figure 25D:
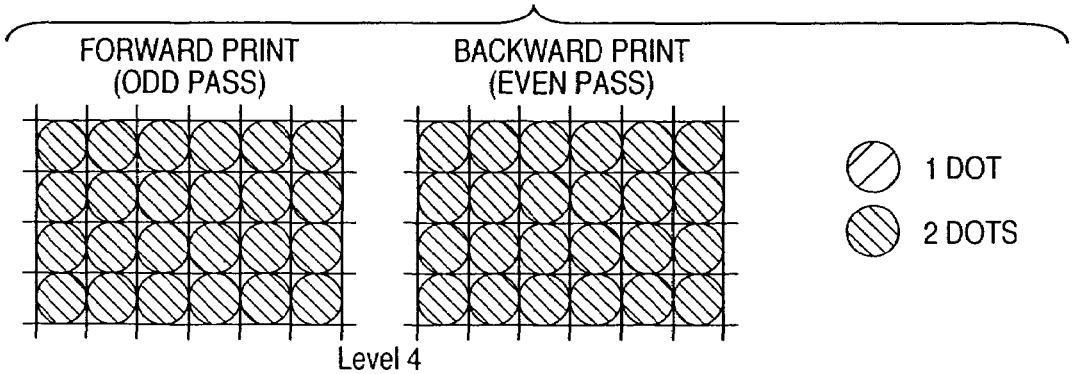

FIGS. 25A to 25D show dot layouts printed in the respective scan directions, i.e., in forward scans of the first, third, and fifth passes, and backward scans of the second, fourth, and sixth pass upon printing images of density levels 1 to 4 using pass allocation patterns in FIG. 24. Level 3 of FIG. 25C is printed by two dots in forward scans and one dot in a backward scan. Independently of selected patterns of respective levels, the densities (the numbers of dots) printed in forward print scans are equal to each other, and those printed in the backward print scans are equal to each other.

Figure 20C:
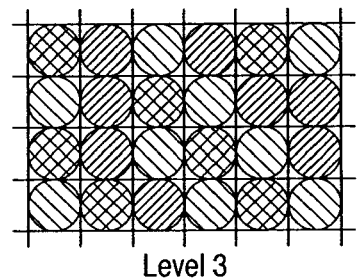
Figure 20D:
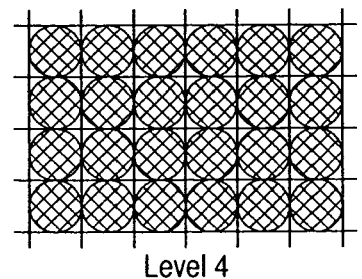
Figure 26A:
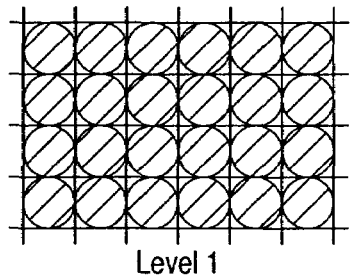
FIGS. 26A to 26D show a case wherein forward and backward scans have suffered some register error in the pass allocation index patterns of the fourth embodiment.
Figure 26B:
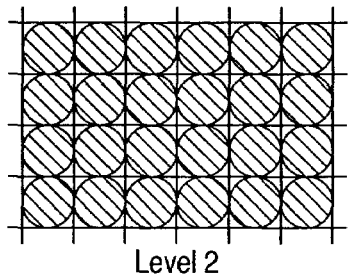
Figure 26C:
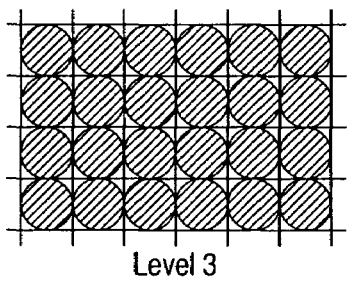
Figure 26D:
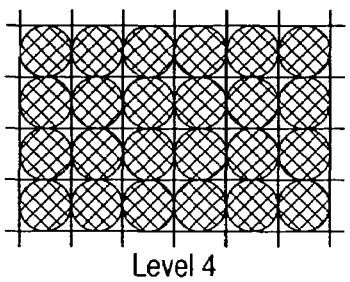

FIGS. 26A to 26D show images formed when the forward and backward print positions have been deviated upon printing using the pass allocation patterns shown in FIG. 24. As can be seen from FIG. 26C, density nonuniformity in FIG. 20C is suppressed. This is because the image in FIG. 20C is printed as a combination of two, three, and four dots, while all pixels in FIG. 26C are printed by three dots. Likewise, this embodiment can successfully suppress generation of texture due to register errors for all gray levels, as shown in FIGS. 26A to 26D.

As described above, in this embodiment, upon focusing an attention on a given density, the pass allocation patterns are defined so that the number of dots printed in the forward scans for the density of interest are equal to each other, and that printed in the backward scans are equal to each other independently of the pass allocation patterns used. For this reason, even when the print positions have deviated, deterioration of image quality can be minimized.

In the description of the first to fourth embodiments, a method of overlapping dots on a single point is adopted. Also, the present invention can be applied to a method of printing dots while shifting their landing positions for respective passes so as to improve the print resolution.

In the description of the above embodiments, six passes are used. Also, the present invention can be applied to various other numbers of passes.

Furthermore, as a method of assigning pass allocation patterns, FIG. 9 has exemplified the method of randomly assigning patterns. However, the present invention is not limited to such specific random pattern generation method, and a method of regularly assigning patterns may be adopted. For example, a method of sequentially selecting a plurality of patterns corresponding to an identical density level in a predetermined order (so-called a sequential method), or a method of determining correspondence between the pixel positions and patterns in advance, and selecting a pattern in correspondence with the position of a pixel of interest may be used.

In the above embodiments, the number of colors have not been especially described. However, the present invention may be applied to multi-color data. The embodiments of the present invention have exemplified a printing apparatus in which the ejection amount is 5 pl, the density levels are expressed by five values, the dot diameter is 40 μm, and ink droplets to be printed to overlap each other are zero to four dots. However, the present invention can be applied to printing apparatuses which have other ejection amounts, density levels, dot diameters, and the numbers of ink droplets to be printed to overlap each other.

Note that the present invention may be applied to either a system constituted by a plurality of devices (e.g., a host computer, interface device, reader, printer, and the like), or an apparatus consisting of a single equipment (e.g., a copying machine, facsimile apparatus, or the like).

The objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit.

As described above, according to the present invention, multi-pass printing control can be implemented by a simple arrangement.

As many apparently widely different embodiments of the present invention can be made without departing from the spirit and scope thereof, it is to be understood that the invention is not limited to the specific embodiments thereof except as defined in the claims.

What is claimed is:

1. An image printing method for completing a print process of a pixel by performing a plurality of movements of a print head, which prints dots on a print medium, with respect to the print medium, comprising the steps of:

selecting specification information on the basis of a density level of the pixel to be printed, said specification information specifying how many dots of a single size are printed on the pixel to be printed by specifying which one or more movements of the plurality of movements of the print head are used to print a particular dot on the pixel to be printed; and printing the one or more dots on the pixel in the one or more movements specified by the specification information, wherein when the density level of the pixel is higher than a predetermined density level, the specification information specifying a combination of the movements used to print the dots is selected.

2. The method according to claim 1, wherein a plurality of sets of specification information are prepared in correspondence with each of the density levels of the pixel, and in the selecting step, one of the plurality of sets of specification information corresponding to the density level of the pixel is selected randomly, in a predetermined order, or according to a position of the pixel.

3. The method according to claim 1, wherein the plurality of movements include both forward and backward movements of the print head, and the specification information corresponding to the density level of the pixel which requires to print two or more dots specifies the combination of the movements used to print the dots so that dots to be printed are distributed to both the forward and backward movements.

4. The method according to claim 1, wherein the plurality of movements include both forward and backward movements of the print head, and the specification information specifies the one or more movements used to print the dots so that dots to be printed are distributed to one of the forward and backward movements.

5. An image printing method for completing a print process of a pixel by performing a plurality of movements of a print head, which prints dots on a print medium, with respect to the print medium, comprising the steps of:

assigning to the pixel specification information on the basis of a density level of the pixel to be printed, said specification information specifying how many dots of a single size are printed on the pixel to be printed by specifying which one or more movements of the plurality of movements of the print head are used to print a particular dot on the pixel to be printed; and printing the one or more dots to the pixel in the one or more movements specified by the assigned specification information, wherein when the density level of the pixel is higher than a predetermined density level, the specification information specifying different movements used to print the dots is assigned to the pixel in the assigning step.

6. An image printing method for completing a print process of a pixel by performing a plurality of movements of a print head, which prints dots on a print medium, with respect to the print medium, comprising the steps of:

selecting specification information on the basis of a density level of the pixel to be printed, said specification information specifying how many dots of a single size are printed on the pixel to be printed by specifying which one or more movements of the plurality of movements of the print head are used to print a particular dot on the pixel to be printed;

generating a print data corresponding to one or more dots to be printed in the one or more movements of the print head on the basis of the specification information selected for the pixel; and printing one or more dots to the pixel on the basis of the generated print data, wherein when the density level of the pixel is a predetermined density level, in the selecting step, one set of specification information is selected from a plurality of sets of specification information specifying different combinations, respectively, as a combination of the movements used to print the predetermined number of dots.

7. The method according to claim 6, wherein a plurality of sets of specification information corresponding to the predetermined density level are selected for pixels so that the number of the one or more dots printed in forward movement become equal to the number of one or more dots printed in backward movement.

8. A print data generating method that generates a print data for completing a print process of a pixel by performing a plurality of movements of a print head, which prints dots on a print medium, with respect to the print medium, comprising the steps of:

selecting specification information on the basis of a density level of the pixel to be printed, said specification information specifying how many dots of a single size are printed on the pixel to be printed by specifying which one or more movements of the plurality of movements of the print head are used to print a particular dot on the pixel to be printed;

and generating the print data corresponding to the one or more dots to be printed in the one or more movements of the print head on the basis of the specification information selected for the pixel, wherein when the density level of the pixel is higher than a predetermined density level, the specification information specifying a combination of the movements used to print the dots is selected.

9. A print data generating method that generates a print data for completing a print process of a pixel by performing a plurality of movements of a print head, which prints dots on a print medium, with respect to the print medium, comprising the steps of:

selecting specification information on the basis of a density level of the pixel to be printed, said specification information specifying how many dots of a single size are printed on the pixel to be printed by specifying which one or more movements of the plurality of movements of the print head are used to print a particular dot on the pixel to be printed; and generating the print data corresponding to the one or more dots to be printed in the one or more movements of the print head on the basis of the specification information selected for the pixel, wherein when the density level of the pixel is a predetermined density level, in the selecting step, one set of specification information is selected from a plurality of sets of specification information specifying different combinations, respectively, as a combination of the movements used to print the predetermined number of dots.

10. A print data generating method that generates a print data for completing a print process of a pixel by performing a plurality of movements of a print head, which prints dots on a print medium, with respect to the print medium, comprising the steps of:

assigning to the pixel specification information on the basis of a density level of the pixel to be printed, said specification information specifying how many dots of a single size are printed on the pixel to be printed by specifying which one or more movements of the plurality of movements of the print head are used to print a particular dot on the pixel to be printed; and generating the print data corresponding to the one or more dots to be printed in the one or more movements of the print head on the basis of the specification information assigned to the pixel, wherein when the density level of the pixel is higher than a predetermined density level, the specification information specifying different movements used to print the dots is assigned to the pixel in the assigning step.

11. An image recording apparatus for completing a print process of a pixel by performing a plurality of movements of a print head, which prints dots on a print medium, with respect to the print medium, comprising:

a memory for storing a plurality of sets of specification information, each set of specification information specifying how many dots of a single size are printed on the pixel to be printed by specifying which one or more movements of the plurality of movements of the print head are used to print a particular dot on the pixel to be printed;

selecting means for selecting one set of specification information corresponding to the density level of the pixel from the plurality of sets of specification information stored in said memory; and printing control means for causing the print head to print the one or more dots on the pixel by the one or more movements specified by the specification information selected by the selecting means, wherein when the density level of the pixel is higher than a predetermined density level, the specification information specifying different movements used to print the dots is selected for the pixel.

12. A computer program product recorded on a computer-readable medium for making a computer generate data to be used in a printer for completing a print process of each pixel by performing a plurality of movements of a print head, which prints dots on a print medium, with respect to the print medium, comprising:

a code for assigning specification information on the basis of a density level of the pixel to be printed, said specification information specifying how many dots of a single size are printed on the pixel to be printed by specifying which one or more movements of the plurality of movements of the print head are used to print a particular dot on the pixel to be printed; and a code for generating the data corresponding to the dots to be printed for respective movements of the print head on the basis of the assigned specification information.

13. The program product according to claim 12, wherein the code for assigning includes selecting one set of specification information corresponding to a density level of a pixel of interest and assigning the selected set of specification information to the pixel of interest.

14. The program product according to claim 12, wherein a plurality of sets of specification information is prepared in correspondence with each of the density levels of the pixel, and in the selecting, one of the plurality of sets of specification information corresponding to a density level of a pixel of interest is selected randomly or in a predetermined order.

* * * * *